United States Patent
Harada et al.

(10) Patent No.: US 8,644,669 B2
(45) Date of Patent: Feb. 4, 2014

(54) RECORDING MEDIUM, REPRODUCTION DEVICE, MESSAGE ACQUISITION METHOD, MESSAGE ACQUISITION PROGRAM, INTEGRATED CIRCUIT

(75) Inventors: Shunji Harada, Osaka (JP); Kaoru Murase, Nara (JP); Masayuki Kozuka, Osaka (JP); Masaya Yamamoto, Arcadia, CA (US); Senichi Onoda, Osaka (JP); Minehisa Nagata, Hyogo (JP)

(73) Assignee: Panasonic Corporation, Osaka (JP)

(*) Notice: Subject to any disclaimer, the term of this patent is extended or adjusted under 35 U.S.C. 154(b) by 1226 days.

(21) Appl. No.: 11/661,281

(22) PCT Filed: Jun. 27, 2006

(86) PCT No.: PCT/JP2006/012774
§ 371 (c)(1),
(2), (4) Date: Apr. 11, 2007

(87) PCT Pub. No.: WO2007/000987
PCT Pub. Date: Jan. 4, 2007

(65) Prior Publication Data
US 2007/0273994 A1    Nov. 29, 2007

Related U.S. Application Data

(60) Provisional application No. 60/693,796, filed on Jun. 27, 2005.

(51) Int. Cl.
*H04N 5/765* (2006.01)
*H04N 5/931* (2006.01)
(52) U.S. Cl.
USPC .......................................... 386/200; 386/204
(58) Field of Classification Search
None
See application file for complete search history.

(56) References Cited

U.S. PATENT DOCUMENTS 5,058,162 A   10/1991  Santon et al.
6,075,552 A    6/2000  Hasegawa
(Continued)

FOREIGN PATENT DOCUMENTS

EP   0 547 899   6/1993
EP   1 098 311   5/2001
(Continued)

OTHER PUBLICATIONS

Matsuzaki et al., "DVD Content Scramble System", National Technical Report vol. 43 No. 3, Engineering Administration Center, Matsushita Electric Industrial Co., Ltd, Jun. 18, 1997, pp. 118-122 (including English translation of Abstract).

(Continued)

*Primary Examiner* — William C Vaughn, Jr.
*Assistant Examiner* — Oluwaseun A Adegeye
(74) *Attorney, Agent, or Firm* — Wenderoth, Lind & Ponack, L.L.P.

(57) ABSTRACT

A recording medium, which is provided by a content provider and allows the content provider to control messages, has recorded thereon content and a program executed at a time of playback of the content by a playback apparatus. The program causing the playback apparatus to interact with a different program prestored in the playback apparatus and executed at the time of the playback of the content and to transmit, to the different program, a message determined according to the result of the interaction. The playback apparatus includes a reading unit reading the program from the recording medium at the time of the playback of the content, a startup unit starting up the read program, an interaction unit interacting with the program, and a processing unit receiving a message corresponding to a result of the interaction from the recording medium and performing a process corresponding to the received message.

20 Claims, 14 Drawing Sheets

(56) References Cited

U.S. PATENT DOCUMENTS

| | | | |
|---|---|---|---|
| 6,104,860 A * | 8/2000 | Lee et al. | 386/213 |
| 6,717,522 B1 * | 4/2004 | Nagatomo et al. | 340/815.4 |
| 6,945,455 B2 * | 9/2005 | Kobayashi et al. | 235/375 |
| 2002/0076195 A1 | 6/2002 | Nakajima et al. | |
| 2004/0078720 A1 | 4/2004 | Ito et al. | |
| 2005/0289139 A1 * | 12/2005 | Takashima et al. | 707/5 |
| 2006/0112220 A1 * | 5/2006 | Otsuka et al. | 711/114 |

FOREIGN PATENT DOCUMENTS

| | | |
|---|---|---|
| EP | 1 349 072 | 10/2003 |
| JP | 5-173891 | 7/1993 |
| JP | 5-304623 | 11/1993 |
| JP | 6-168580 | 6/1994 |
| JP | 8-186795 | 7/1996 |
| JP | 10-13813 | 1/1998 |
| JP | 2000-163803 | 6/2000 |
| JP | 2001-166996 | 6/2001 |
| JP | 2001-186462 | 7/2001 |
| JP | 2002-64785 | 2/2002 |
| JP | 2003-296044 | 10/2003 |
| WO | 03/107342 | 12/2003 |

OTHER PUBLICATIONS

Partial English Translation of Nakano et al., "Key Management System for Digital Content Protection", The 2001 Symposium on Cryptography and Information Security, SCIS 2001, 5A-5, Jan. 2001, pp. 213-218.

* cited by examiner

FIG. 3

| | APPARATUS UNIQUE INFORMATION | MESSAGE |
|---|---|---|
| (1) | APPARATUS MAKER ID=A | PLAYBACK IS NOT POSSIBLE BECAUSE THIS IS UNAUTHORIZED PLAYER. CONTACT SERVICE CENTER. |
| (2) | APPARATUS MAKER ID=B and MODEL NUMBER=B01 and APPARATUS SERIAL NUMBERS=001~300 | PLAYBACK IS NOT POSSIBLE DUE TO PROBLEMS WITH PLAYER. CONTACT SERVICE CENTER. |
| (3) | APPARATUS MAKER ID=C and (MODEL NUMBER=C01 or C02) and FIRM VERSION NUMBER=1.0 | PLAYER REQUIRES VERSION UPGRADE OF FIRMWARE. UPDATE FIRMWARE FROM SERVER. |

FIG. 9

| | APPARATUS STATE INFORMATION | MESSAGE |
|---|---|---|
| (1) | 1A (REVOKED STATE DUE TO FAILURE IN ACQUISITION OF MEDIA KEY) | PLAYBACK IS NOT POSSIBLE BECAUSE THIS PLAYER HAS BEEN REVOKED. CONTACT SERVICE CENTER. |
| (2) | 1B (REVOKED STATE DUE TO OTHER FAILURE—i.e. FAILURE IN ACQUISITION OF INFORMATION THAT INDICATES PLAYBACK APPARATUS IS LEGITIMATE) | PLAYBACK IS NOT POSSIBLE BECAUSE THIS PLAYER HAS BEEN REVOKED. CONTACT SERVICE CENTER. |
| (3) | 2A (DECRYPTION ANOMALOUS STATE DUE TO FAILURE IN ACQUISITION OF CONTENT KEY) | ACQUIRE CONTENT KEY FROM SERVER TO PLAY BACK THIS CONTENT. |
| (4) | 2B (DECRYPTION ANOMALOUS STATE DUE TO OTHER FAILURE—i.e. FAILURE IN ACQUISITION OF INFORMATION REQUIRED FOR CONTENT PLAYBACK) | CONTACT SERVICE CENTER TO PLAY BACK THIS CONTENT. |

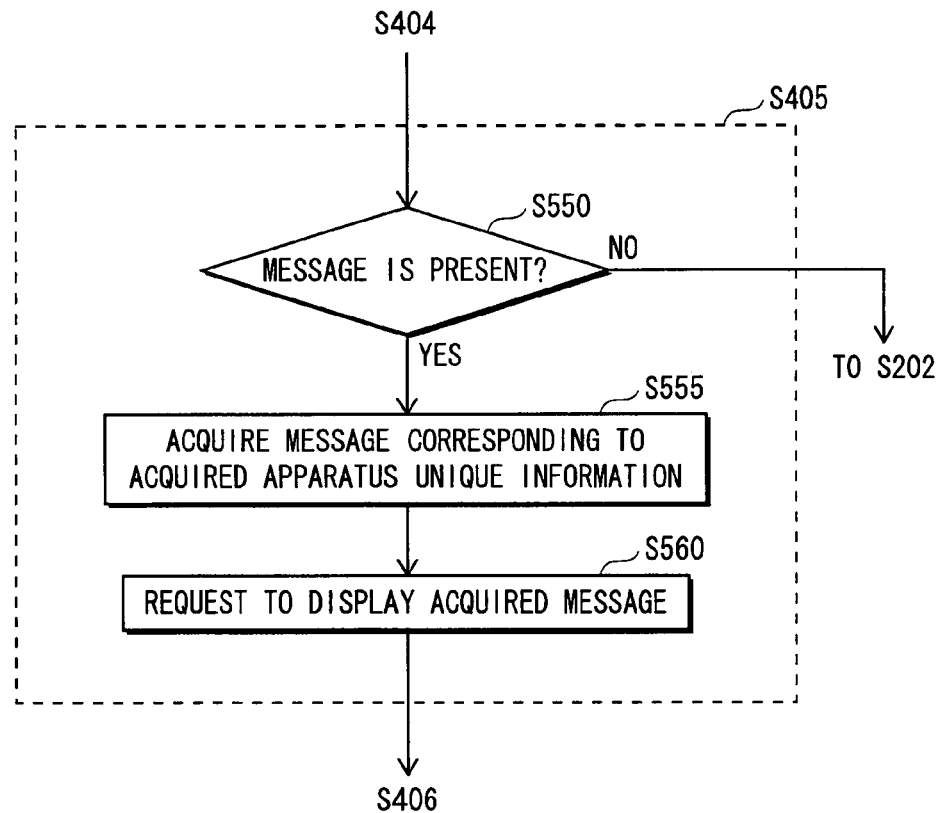
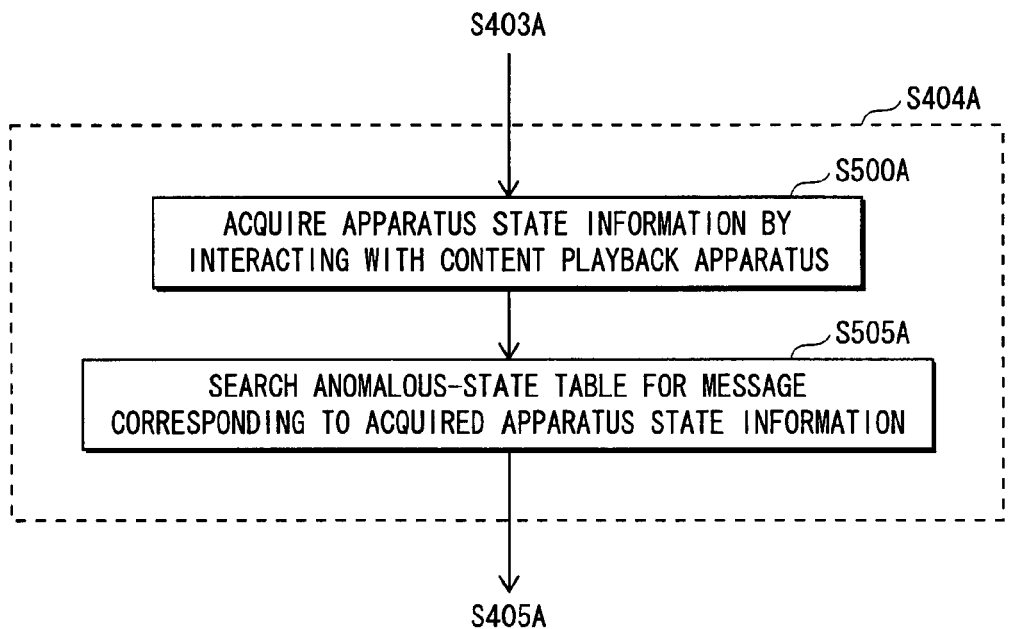

RECORDING MEDIUM, REPRODUCTION DEVICE, MESSAGE ACQUISITION METHOD, MESSAGE ACQUISITION PROGRAM, INTEGRATED CIRCUIT

This application is a U.S. National Stage application of International Application No. PCT/JP2006/312774, filed Jun. 27, 2006, which is claiming benefit of U.S. Provisional Application Ser. No. 60/693,796, filed Jun. 27, 2005.

TECHNICAL FIELD

The present invention relates to a technology for displaying a message to the user during content playback, especially to a technology for displaying a message reflecting an intention of a content provider.

BACKGROUND ART

A widely prevailing system, along with the development of higher-capacity recording media in recent years, is one to digitize content data of copyrighted works, such as movies, and distribute the digitalized data stored in digital optical disks or other recording media. With the use of such a system, copyright protection of the content data is necessary, and playback and duplication of the content data must be conducted only within the limits to which the copyright holders have consented. A common system used for protecting copyrighted works from being illegally copied without consent of the copyright holders has a mechanism in which content data is encrypted using a content key that is managed by the copyright holder and then stored in a disk, and only terminals having a corresponding content key can decrypt the encrypted content data in the disk. Here, in order to obtain the content key, an agreement with the copyright holder on provisions regarding copyright protection must be made.

This kind of system has means for informing the user of a playback anomaly in the case when a playback anomaly caused by some reasons during playback is determined on a terminal apparatus that plays back content data read from a recording medium, as disclosed in Patent Reference 1.

<Patent Reference 1> Japanese Laid-Open Patent Application H08-186795

DISCLOSURE OF THE INVENTION

Problems that the Invention is to Solve

However, in the conventional technology, messages used for informing the user of anomalies are decided by the manufacturer of the playback apparatus, and the problem therefore remains that the content provider cannot control the messages.

Therefore, the present invention aims at offering a recording medium, a playback apparatus, a message acquisition method, a message acquisition program, and an integrated circuit of the playback apparatus, all of which allow the content provider to control messages.

Means to Solve the Problem

In order to achieve the object above, the present invention is a recording medium provided by content provider and recording thereon content and a program which is executed during playback of the content by a playback apparatus. The program causes the playback apparatus to execute: an interacting step of interacting with a different program that is prestored in the playback apparatus and executed during the playback of the content; and an output step of transmitting, to the different program, a message determined according to the result of the interaction.

Advantageous Effects of the Invention

According to the structure above, since the recording medium records thereon a program including an output step of transmitting a message in accordance with the result of the interaction, the playback apparatus can receive a message in accordance with the result of the interaction with the recording medium. Herewith, the content provider is capable of controlling messages to be output to the playback apparatus by recording the program on the recording medium.

In this case, the interaction step may acquire apparatus unique information unique to the playback apparatus by interacting with the different program, and the output step may output, to the different program, a message determined according to the apparatus unique information.

According to the structure above, since the output step of the program recorded on the recording medium outputs a message in accordance with the apparatus unique information, the content provider is capable of controlling messages to be output according to the apparatus unique information.

In this case, the output step may include: an acquisition step of acquiring, according to the apparatus unique information, a message which the playback apparatus is capable of displaying; and a transmission step of transmitting the acquired message to the different program.

According to the structure above, the program recorded on the recording medium acquires a message which the playback apparatus is capable of displaying according to the apparatus unique information, and transmits the acquired message to a different program in the playback apparatus. Herewith, the content provider is capable of causing the playback apparatus to display messages to be output according to the apparatus unique information.

In this case, the acquisition step may acquire, in the case where the apparatus unique information indicates that the playback apparatus is unauthorized or anomalous, a message indicating that the playback apparatus is unauthorized or anomalous.

According to the structure above, in the case where the playback apparatus is unauthorized or anomalous, the acquisition step of the program recorded on the recording medium acquires a message indicating accordingly. Herewith, the content provider is capable of notifying the user that the playback apparatus is an unauthorized or anomalous apparatus.

In this case, the interacting step may acquire apparatus state information indicating an operating state of the playback apparatus by interacting with the different program, and the output step may transmit, to the different program, a message determined according to the apparatus state information.

According to the structure above, since the output step of the program recorded on the recording medium outputs a message in accordance with the apparatus state information, the content provider is capable of controlling messages to be output according to the apparatus state information.

In this case, the output step may include: an acquisition step of acquiring, according to the apparatus state information, a message which the playback apparatus is capable of displaying; and a transmission step of transmitting the acquired message to the different program.

According to the structure above, the program recorded on the recording medium acquires a message which the playback apparatus is capable of displaying according to the apparatus state information, and transmits the acquired message to a different program in the playback apparatus. Herewith, the content provider is capable of causing the playback apparatus to display messages to be output according to the apparatus state information.

In this case, the acquisition step may acquire, in the case where the apparatus state information indicates that the playback apparatus is in an unauthorized or anomalous state, a message indicating that the playback apparatus is in the unauthorized or anomalous state.

According to the structure above, the acquisition step of the program recorded on the recording medium acquires, in the case where the playback apparatus is in an unauthorized or anomalous state, a message indicating accordingly. Herewith, the content provider is capable of notifying the user that the playback apparatus is in the unauthorized or anomalous state.

In this case, the recording medium may include a storage area storing therein the message.

According to the structure above, since the recording medium includes a storage area that stores therein the message, the content provider is capable of storing, in the recording medium, messages to be output to the playback apparatus.

Here, in the case where the message indicates one of (1) the playback apparatus being unauthorized or anomalous and (2) the playback apparatus being in an unauthorized or anomalous state, the program may cause the playback apparatus to execute, in addition to the output of the message, a playback inhibition step of inhibiting the playback of the content.

According to the structure above, since the program of the recording medium includes the playback inhibition step, it can cause the playback apparatus to inhibit the playback of the content. Herewith, the content provider is capable of inhibiting an unauthorized or anomalous playback apparatus and a playback apparatus in an unauthorized or anomalous state from playing back the content.

In this case, the content may include image data, the playback apparatus may play back an image based on the image data, and the program may further cause the playback apparatus to execute an overlay display step of displaying the message over the image of the contents being played back.

According to the structure above, since the program of the recording medium includes the overlay display step, it can cause the playback apparatus to display a message over an image of the content being played back. Herewith, the content provider is capable of displaying a message desired to be notified to the user over the image of the content being played back.

In this case, the message may indicate one of (1) the playback apparatus being unauthorized or anomalous and (2) the playback apparatus being in an unauthorized or anomalous state, and the program may further cause the playback apparatus to execute a process selection step of receiving, from the user, an instruction of whether to inhibit the playback of the content or to display the message over an image of the content being played back.

According to the structure above, since the program of the recording medium includes the process selection step, it can cause the playback apparatus to perform either inhibition of the playback of the content or overlay display of a message based on an instruction of the user.

In this case, the program may include control information indicating performing one of (1) an operation of inhibiting the playback of the content and (2) an operation of displaying the message over an image of the content being played back, and the output step may further transmit the control information to the different program.

According to the structure above, the program of the recording medium includes the control information, and the output step transmits the control information to the playback apparatus. Herewith, it can cause the playback apparatus to perform a process based on the control information.

The present invention is also a playback apparatus for playing back content from a recording medium that is provided by content provider. Here, the recording medium records thereon the content and a program which is executed during the playback of the content. The playback apparatus comprises: a reading unit operable to read the program from the recording medium during the playback of the content; a startup unit operable to start up the read program; an interaction unit operable to interact with the program; and a processing unit operable to receive a message in accordance with result of the interaction from the program and perform a process in accordance with the received message.

According to the structure above, since the playback apparatus receives, from the program, a message in accordance with the result of the interaction, the content provider is capable of controlling the playback apparatus by messages.

In this case, the interaction unit may notify, to the program, apparatus unique information unique to the playback apparatus, and the processing unit may receive a message in accordance with the apparatus unique information from the program as the result of the interaction.

According to the structure above, the playback apparatus receives, from the recording medium, a message in accordance with the apparatus unique information, the content provider is capable of controlling the playback apparatus by messages.

In this case, the apparatus unique information may be prestored in the playback apparatus.

According to the structure above, since the apparatus unique information is prestored in the playback apparatus, the convent provider is capable of readily generating a message in accordance with the apparatus unique information.

In this case, the interaction unit may notify, to the program, apparatus state information indicating an operating state of the playback apparatus.

According to the structure above, since the playback apparatus receives, from the recording medium, a message in accordance with the apparatus state information, the content provider is capable of controlling the playback apparatus according to the apparatus state information.

In this case, the interaction unit may acquire the apparatus state information which indicates an operating state of the playback apparatus during the playback of the content stored in the recording medium, and notify the acquired apparatus state information to the program. Here, the processing unit receives a message corresponding to the apparatus state information from the program as the result of the interaction.

According to the structure above, the playback apparatus is able to acquire apparatus state information in accordance with the operation during the playback of the content and notify the acquired apparatus state information to the program. Herewith, the content provider is capable of controlling the playback apparatus according to change in the operation during the playback.

In this case, the processing unit may display the received message.

According to the structure above, since the playback apparatus displays the received message, the content provider is capable of controlling messages to be displayed by the playback apparatus.

Here, in the case where the received message indicates one of (1) the playback apparatus being unauthorized or anomalous and (2) the playback apparatus being in an unauthorized or anomalous state, the playback apparatus may further comprise: a playback inhibiting unit operable to inhibit the playback of the content in addition to displaying the message.

According to the structure above, the playback apparatus is able to inhibit the playback of the content. Herewith, the content provider is capable of inhibiting an unauthorized or anomalous playback apparatus and a playback apparatus in an unauthorized or anomalous state from playing back the content.

In this case, the content may include image data which is a basis of an image to be played back by the playback apparatus, and the processing unit may display the message over the image of the content being played back.

According to the structure above, the playback apparatus is able to display a message over an image of the content being played back. Herewith, the content provider is capable of displaying a message desired to be notified to the user over the image of the content being played back.

In this case, the message may indicate one of (1) the playback apparatus being unauthorized or anomalous and (2) the playback apparatus being in an unauthorized or anomalous state, and the processing unit may perform one of (1) an operation of inhibiting the playback of the content and (2) an operation of displaying the message over an image of the content being played back.

According to the structure above, the content provider is capable of either inhibiting the playback of the content or notifying the user by displaying a desired message over an image of the content being played back.

In this case, the processing unit may receive, from the user, an instruction of whether to inhibit the playback of the content or to display the message over the image of the content being played back, and perform the process based on the received instruction.

According to the structure, the playback apparatus is capable of performing either inhibition of the playback of the content or overlay display of a message based on an instruction of the user.

In this case, the program may record thereon control information indicating one of (1) inhibiting the playback of the content and (2) displaying the message over the image of the content, and the processing unit may read the control information from the program and performs the process based on the read control information.

According to the structure above, the playback apparatus is capable of performing either inhibition of the playback of the content or overlay display of a message based on the control information included in the program of the recording medium.

BRIEF DESCRIPTION OF THE DRAWINGS

FIG. 3 shows an example of a data configuration of an anomalous-apparatus table according to Embodiment 1;

FIG. 9 shows an example of a data configuration of an anomalous-state table according to Embodiment 1;

FIG. 14 is a flowchart showing detailed operations of Step S405;

FIG. 15 is a flowchart showing detailed operations of Step S404A; and

Figure 1:
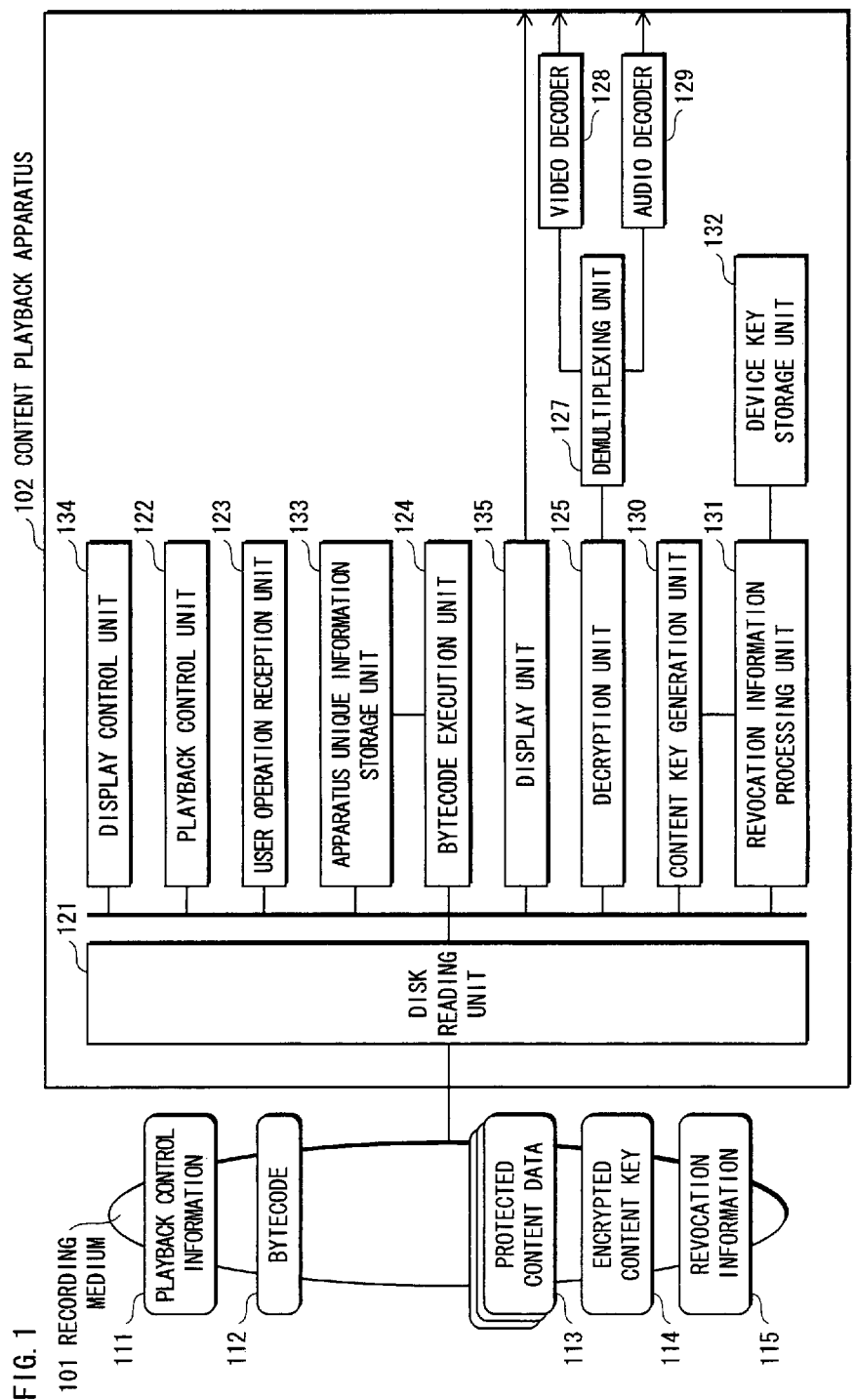
FIG. 1 is a block diagram showing structures of a recording medium 101 and a content playback apparatus 102 according to Embodiment 1.

EXPLANATION OF REFERENCES 101, 101A recording medium
102, 102A content playback apparatus
111, 111A playback control information
112, 112A bytecode
113, 113A protected content data
114, 114A encrypted content key
115, 115A revocation information
121, 121A disk reading unit
122, 122A playback control unit
123, 123A user operation reception unit
124, 124A bytecode execution unit
125, 125A decryption unit
127, 127A demultiplexing unit
128, 128A video decoder
129, 129A audio decoder
130, 130A content key generation unit
131, 131A revocation information processing unit
132, 132A device key storage unit
133 apparatus unique information storage unit
134, 134A display control unit
135, 135A display unit
136A apparatus state information acquisition unit

BEST MODE FOR CARRYING OUT THE INVENTION

The following explains the best modes for implementing the present invention with reference to drawings.

Embodiment 1

FIG. 1 shows structures of a recording medium 101 and a content playback apparatus 102 of one embodiment of the present invention.

On the recording medium 101, playback control information 111, a bytecode 112, protected content data 113, an encrypted content key 114, and revocation information 115 are recorded. As the recording medium 101, a BD (Blu-ray Disc) is, for example, assumed here; however, other types of recording media may also be used.

Embodiment 1 assumes that one content is composed of multiple pieces of MPEG2-TS (Motion Picture Expert Group 2-Transport Stream) data. It is the playback control information 111 that specifies the playback order of the protected content data 113 when the content is played back.

A JAVA (registered trademark) bytecode is an example of the bytecode 112, which is an executable code composed of fixed-length instruction sets. Some process, such as obfuscation of bytecode, may be performed so that confidential information and detailed processes included in the software are not revealed by analytical techniques. In this case, the bytecode execution unit 124 has a function of removing the obfuscation or the like. Details on the execution performed by the bytecode 112 are described later. Note that the present embodiment is described using a JAVA byte code as an example; however, an execution program other than that can be employed.

The protected content data 113 is data created by performing an encryption process on MPEG2-TS data using a content key. Here, MPEG2-TS data is the data in plaintext which can output image using a decoder. Therefore, in order to play back the protected content data 113, a decryption process using the content key needs to be performed on the protected content data 113 to thereby restore the plain-text MPEG2-TS data.

The encrypted content key 114 is data created by, with the use of a media key, encrypting the content key used for decrypting the protected content data. The media key is explained later.

Next, the revocation information 115 is described. The key management authority has a group of multiple device keys and multiple media keys. The key management authority assigns one device key and a key ID number of the device key to each content playback apparatus 102, and gives the assigned device key and key ID number to the content playback apparatus 102. Also, the key management authority assigns one media key to the recording medium 101. Next, the key management authority creates an encrypted media key by encrypting a media key using the device key assigned to each content playback apparatus 102, and creates a list itemizing encrypted media keys and key ID numbers for all device keys.

This list is the revocation information 115. Note however that this simple method has a shortcoming that, as the number of the content playback apparatuses 102 becomes large, the data size of the revocation information 115 becomes unrealistically large. Therefore, a method disclosed in "Digital Content Hogo-you Kagi Kanri Houshiki (Key Management Method for Protecting Digital Contents)" (Nakano, Obmori and Tatebayashi, Symposium on Cryptography and Information Security, SCIS2001 5A-5, January 2001) can be used to compress the revocation information 115 to thereby reduce the data size. The data compression method is not limited to this, and a different method may also be adopted.

The content playback apparatus 102 comprises: a disk reading unit 121; a playback control unit 122; a user operation reception unit 123; a bytecode execution unit 124; a decryption unit 125; a demultiplexing unit 127; a video decoder 128; an audio decoder 129; a content key generation unit 130; a revocation information processing unit 131; a device key storage unit 132; an apparatus unique information storage unit 133; a display control unit 134; and a display unit 135.

A computer system composed of a CPU, a work memory, a flash memory, a BD drive and a remote controller is a practical embodiment of the content playback apparatus 102. The disk reading unit 121 is the BD drive; the device key storage unit 132 and apparatus unique information storage unit 133 are the flash memory; and the user operation reception unit 123 is the remote controller. The playback control unit 122, byte code execution unit 124, decryption unit 125, demultiplexing unit 127, video decoder 128, audio decoder 129, content key generation unit 130, revocation information processing unit 131, display control unit 134, and display unit 135 can be configured by software operating with the use of the CPU and work memory; however, these units can be realized by hardware implementation, and the present invention is not limited to the software implementation.

Thus concludes the descriptions on the structures of the recording medium and the content playback apparatus, which are one embodiment of the present invention.

Content Playback Process

Figure 2:
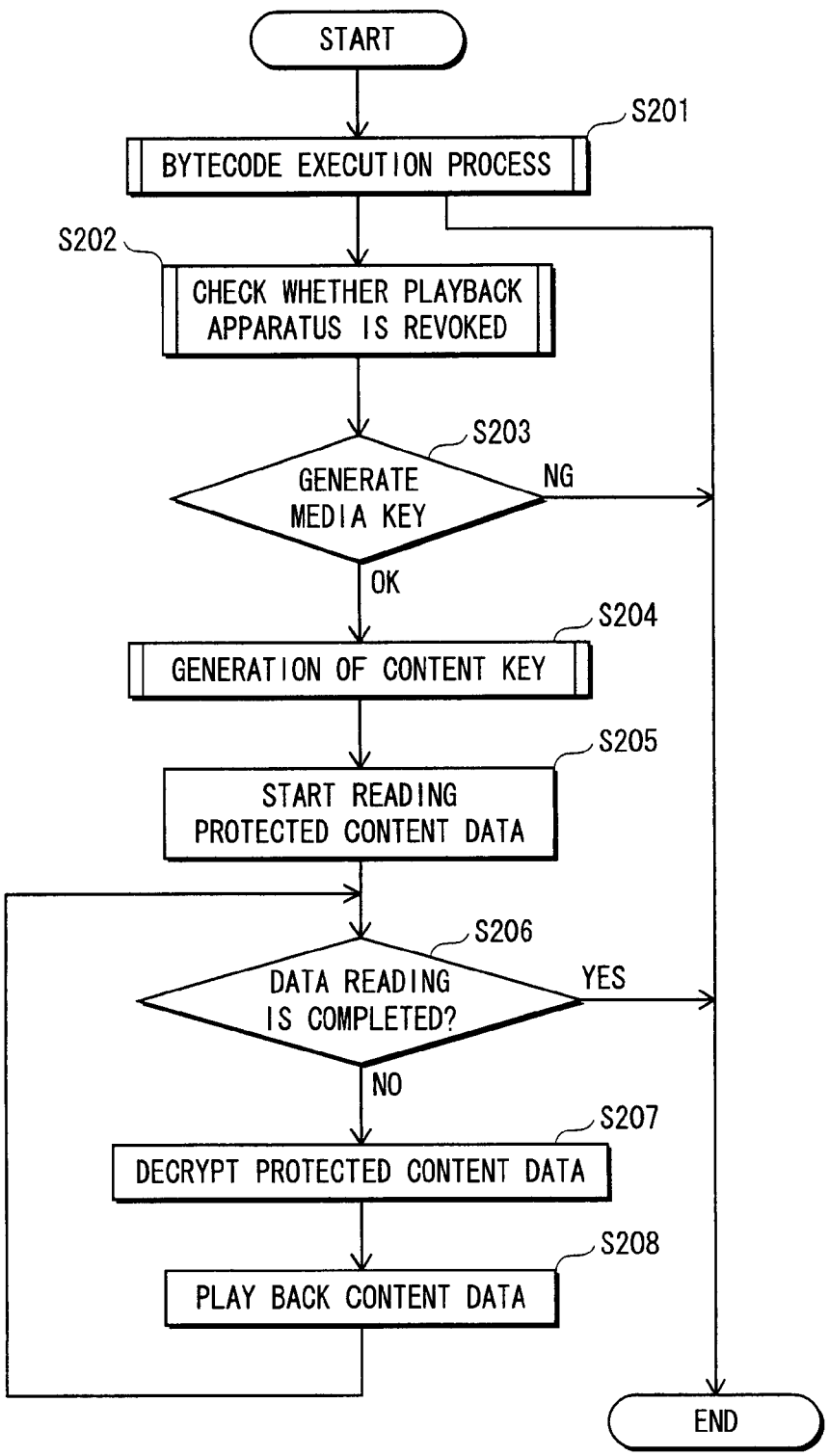
FIG. 2 is a flowchart showing operations of a content playback process according to Embodiment 1.

The following describes a content playback process with reference to FIG. 2.

First, the content playback process starts when a user's request for content playback start is received by the user operation reception unit 123.

When the user operation reception unit 123 receives a content playback request, the content playback apparatus 102 reads the bytecode 112 from the recording medium 101, and the bytecode 112 is executed by the bytecode execution unit 124 (Step S201). The detailed description of the process performed by the bytecode execution unit 124 is given later.

In the case where the content playback process is continued as result of Step S201, the following steps are carried out.

The revocation information processing unit 131 performs the revocation confirmation process of the content playback apparatus 102 (S202). The detail of the revocation confirmation process is described later.

The subsequent process branches depending on whether the generation of the media key in the revocation confirmation process S202 is successful or not (S203).

When the generation of the media key in the revocation confirmation process S202 is successful, the content playback apparatus 102 reads the encrypted content key 114 from the recording medium 101 and generates a content key (S204). The detail of the content key generation is described later.

If the generation of the media key in the revocation confirmation process S202 fails, the content playback apparatus 102 aborts the process.

After the completion of S204, in order to play back a content requested by the user, the playback control unit 122 instructs start of reading the protected content data 113, which is to be a playback target, in accordance with the playback control information 111 (S205).

Until all the protected content data 113 is read, the following process is repeated (S206).

Using the content key generated by the content key generation unit 130, the decryption unit 125 performs a decryption process on the protected content data 113 read from the recording medium 101 (S207). AES (Advanced Encryption Standard) is used for the encryption of the protected content data; however, the present invention is not limited to this. The decrypted content data is MPEG2-TS data in plain text, which is then demultiplexed into video and audio streams by the demultiplexing unit 127. These video and audio streams are sent to the video decoder 128 and audio decoder 129, respectively, and subsequently output to a video-audio apparatus, such as a TV (S208). During the playback of the content, the decryption of the protected content data 113 (S207) is performed in parallel.

At the completion of reading all the protected content data 113 corresponding to the content requested by the user, the content playback process ends (S206).

Thus concludes the description of the content playback process.

Note that the procedure of the content playback process shown here is merely one example; the present invention is not limited to this.

Bytecode Execution Process

The bytecode 112 stored in the recording medium 101 includes an anomalous-apparatus table listing therein (i) apparatus unique information of, for example, apparatuses where bugs have been found, apparatuses that have been identified as unauthorized, and/or emulators (all of such apparatuses are hereinafter referred to as "anomalous apparatus") and (ii) messages to these apparatuses.

FIG. 3 shows an example of the anomalous-apparatus table. As shown in FIG. 3, the apparatus unique information is information unique to each content playback apparatus 102, and is composed of, for example, an apparatus maker ID, a model number of the playback apparatus, a manufacturing serial number of the playback apparatus, and a version number of playback process firmware of the playback apparatus. As to the messages, besides messages informing the user that the playback process cannot be carried out, messages can also be set that indicate reasons for why the playback process cannot be performed and how to deal with the problems (e.g. directing the user to update the firmware).

The bytecode 112 stored in the recording medium 101 further includes: an acquisition step of acquiring apparatus unique information from the apparatus unique information storage unit 133 of the content-playback apparatus 102; a judging step of judging whether the acquired apparatus unique information is included in the anomalous-apparatus table described above; and a display request step of, when the acquired apparatus unique information is judged, in the judging step, to be included in the anomalous-apparatus table, requesting the content playback apparatus 102 to display a message for the apparatus, which is set in the anomalous-apparatus table.

Figure 4:
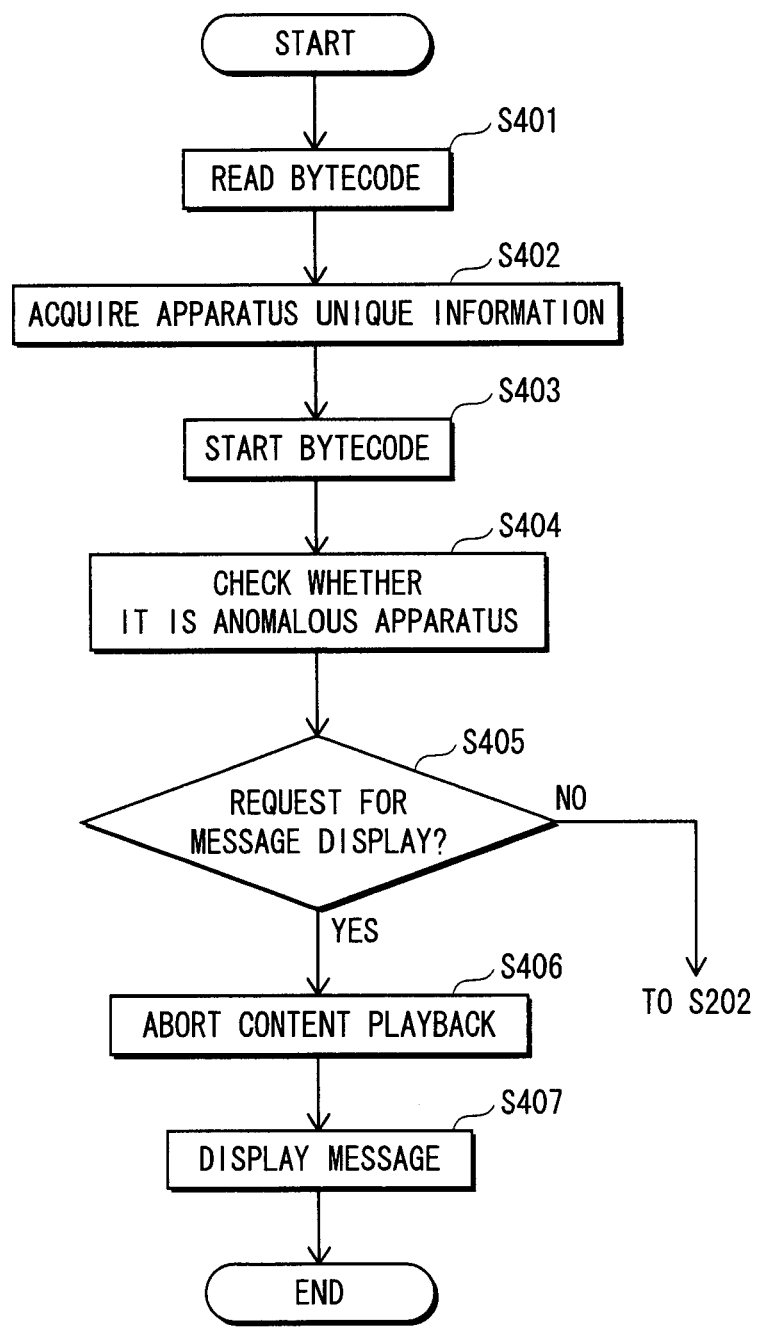
FIG. 4 is a flowchart showing operations of a bytecode execution process according to Embodiment 1.

The following describes the bytecode execution process with reference to FIG. 4. Note that this process is the detail of S201 in FIG. 2.

The bytecode execution unit 124 reads the bytecode 112 from the recording medium 101 (S401).

Next, the bytecode execution unit 124 acquires apparatus unique information from the apparatus unique information storage unit 133 of the content playback apparatus 102 (S402). Here, the apparatus unique information is information unique to each content playback apparatus 102, and is composed of, for example, an apparatus maker ID, a model number of the playback apparatus, a manufacturing serial number of the playback apparatus, and a version number of playback process firmware of the playback apparatus. Individual apparatus unique information is assigned to each content playback apparatus 102. That is, with apparatus unique information, each content playback apparatus 102 can be identified.

Next, the bytecode is started (S403).

The bytecode execution unit 124 executes the acquired bytecode 112 to thereby judge whether the apparatus unique information acquired in S402 is included in the anomalous-apparatus table (S404).

In the case of FIG. 3, if the apparatus unique information acquired in S402 matches the apparatus unique information of (1) in the anomalous-apparatus table of FIG. 3—i.e. if the apparatus unique information acquired in S402 includes "APPARATUS MAKER ID=A", a request for displaying the message of (1) is made.

Then, when judging in S404 that the apparatus unique information is included in the anomalous-apparatus table, the bytecode execution unit 124 transmits a request for displaying a message aimed for the apparatus together with the message to the display control unit 134 of the content playback apparatus 102; when judging that the apparatus unique information is not included in the anomalous-apparatus table, the bytecode execution unit 124 refrains from transmitting the request for displaying a message aimed for the apparatus (S405).

Next, when receiving a request for displaying a message from the bytecode execution unit 124, the display control unit 134 of the content playback apparatus 102 indicates the display unit 135 to display the message and ends the content playback process (S406). The display unit 135 displays the message (S407).

On the other hand, when not receiving a request for displaying a message from the bytecode execution unit 124, the display control unit 134 of the content playback apparatus 102 carries on the content playback process (to S202).

It is a copyright holder of the content that selects the bytecode 112 to be stored in the recording medium 101. Thereby, the copyright holder is capable of having control of displaying a specified message aimed for a specific content playback apparatus having a problem.

Thus concludes the description of the bytecode execution process.

Revocation Confirmation Process of Content Playback Apparatus 102

Figure 5:
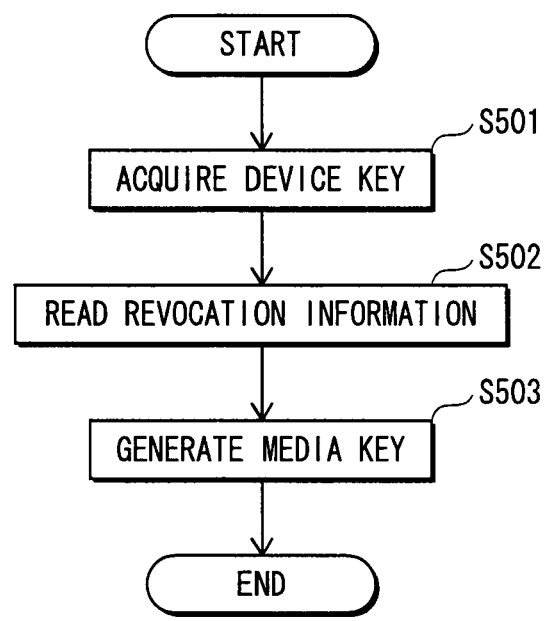
FIG. 5 is a flowchart showing operations of a revocation confirmation process of the content playback apparatus according to Embodiment 1.

The following describes the revocation confirmation process of the content playback apparatus 102 with reference to FIG. 5. Note that this process is the detail of S202 in FIG. 2.

The revocation confirmation process is a process performed before the content playback for checking, based on the revocation information recorded on the recording medium 101, whether the content playback apparatus 102 has been revoked.

The revocation information processing unit 131 reads the device key acquired from the device key storage unit 132 (S501). The device key is information unique to each content playback apparatus, therefore being capable of identifying a particular content playback apparatus 102.

Next, the revocation information processing unit 131 reads the revocation information 115 stored in the recording medium 101 (S502), and generates a media key using the read device key and revocation information 115 (S503).

In the case where the content playback apparatus 102 has been revoked, a media key cannot be generated. The generation of the media key using the device key and revocation information 115 is described in detail in "National Technical Report," Volume 43, Number 3, pp. 118-122 ("Gijyutsu Somu" (technological general administration) Center, Matsushita Electric Industrial Co., Ltd., issued on Jun. 18, 1997).

Thus concludes the description of the revocation confirmation process of the content playback apparatus 102.

Content Key Generation Process

Figure 6:
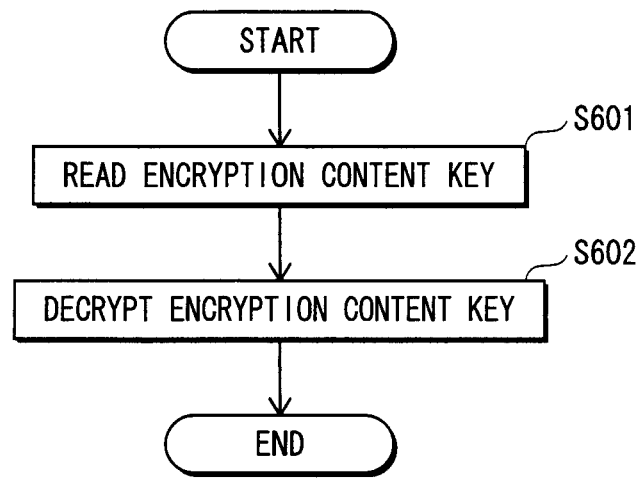
FIG. 6 is a flowchart showing operations of a content key generation process according to Embodiment 1.

The following describes the content key generation process with reference to FIG. 6. Note that this process is the detail of S204 in FIG. 2.

The content key generation unit 130 acquires the media key generated in S202 from the revocation information processing unit 131 (S601). Next, the content key generation unit 130 reads the encrypted content key 114 from the recording medium 101, and decrypts the encrypted content key 114 using the media key acquired in S401 (S602). AES is used for encrypting and decrypting the content key; however, the present invention is not limited to this.

Thus concludes the description of the content key generation process.

Embodiment 2

Figure 7:
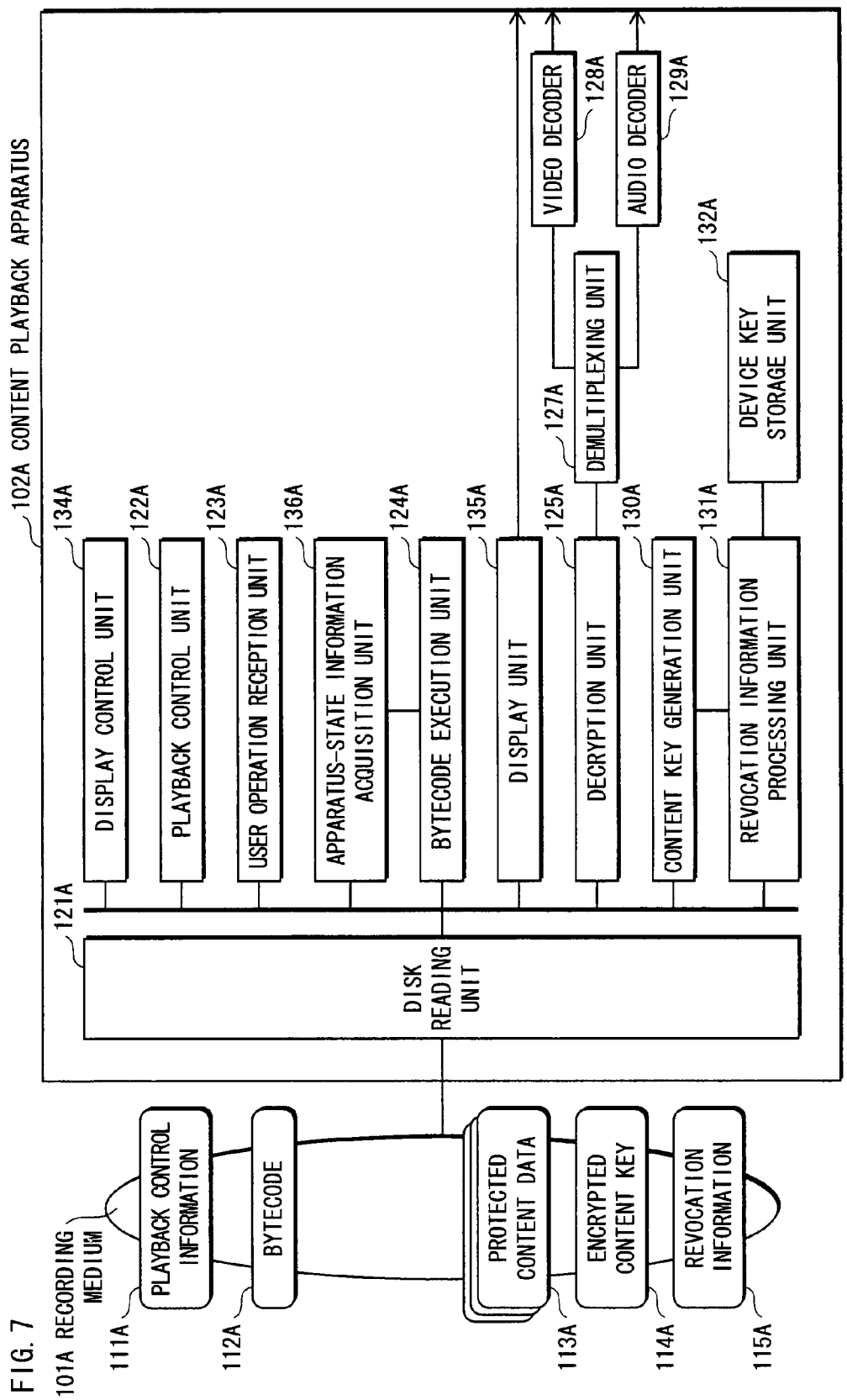
FIG. 7 is a block diagram showing structures of a recording medium 101A and a content playback apparatus 102A according to Embodiment 2.

FIG. 7 shows structures of a recording medium 101A and a content playback apparatus 102A of one embodiment of the present invention. The following describes the present embodiment, focusing on its differences from Embodiment 1.

On the recording medium 101A, a bytecode 112A, protected content data 113A, an encrypted content key 114A, and revocation information 115A are recorded. As the recording medium 101A, exactly the same recording medium as that of Embodiment 1 can be used, and the detailed explanation for the recording medium 101A is therefore not given here. As to data recorded on the recording medium 101A, it is essentially the same as that of Embodiment 1, except for details of the content of the bytecode, and the detailed explanation for the recorded data is therefore omitted here. Note that the details of the content of the bytecode are described later.

The content playback apparatus 102A comprises: a disk reading unit 121A; a playback control unit 122A; a user operation reception unit 123A; a bytecode execution unit 124A; a decryption unit 125A; a demultiplexing unit 127A; a video decoder 128A; an audio decoder 129A; a content key generation unit 130A; a revocation information processing unit 131A; a device key storage unit 132A; a display control unit 134A; a display unit 135A; and an apparatus state information acquisition unit 136A.

A computer system composed of a CPU, a work memory, a flash memory, a BD drive and a remote controller is a practical embodiment of the content playback apparatus 102A. The disk reading unit 121A is the BD drive; the device key storage unit 132A is the flash memory; and the user operation reception unit 123A is a remote controller. The playback control unit 122A, bytecode execution unit 124A, decryption unit 125A, demultiplexing unit 127A, video decoder 128A, audio decoder 129A, content key generation unit 130A, revocation information processing unit 131A, display control unit 134A, display unit 135A, and apparatus state information acquisition unit 136A can be configured by software operating with the use of the CPU and work memory; however, these units can be realized by hardware implementation, and the present invention is not limited to the software implementation.

Thus concludes the descriptions on the structures of the recording medium and the content playback apparatus of one embodiment of the present invention.

Content Playback Process

Figure 8:
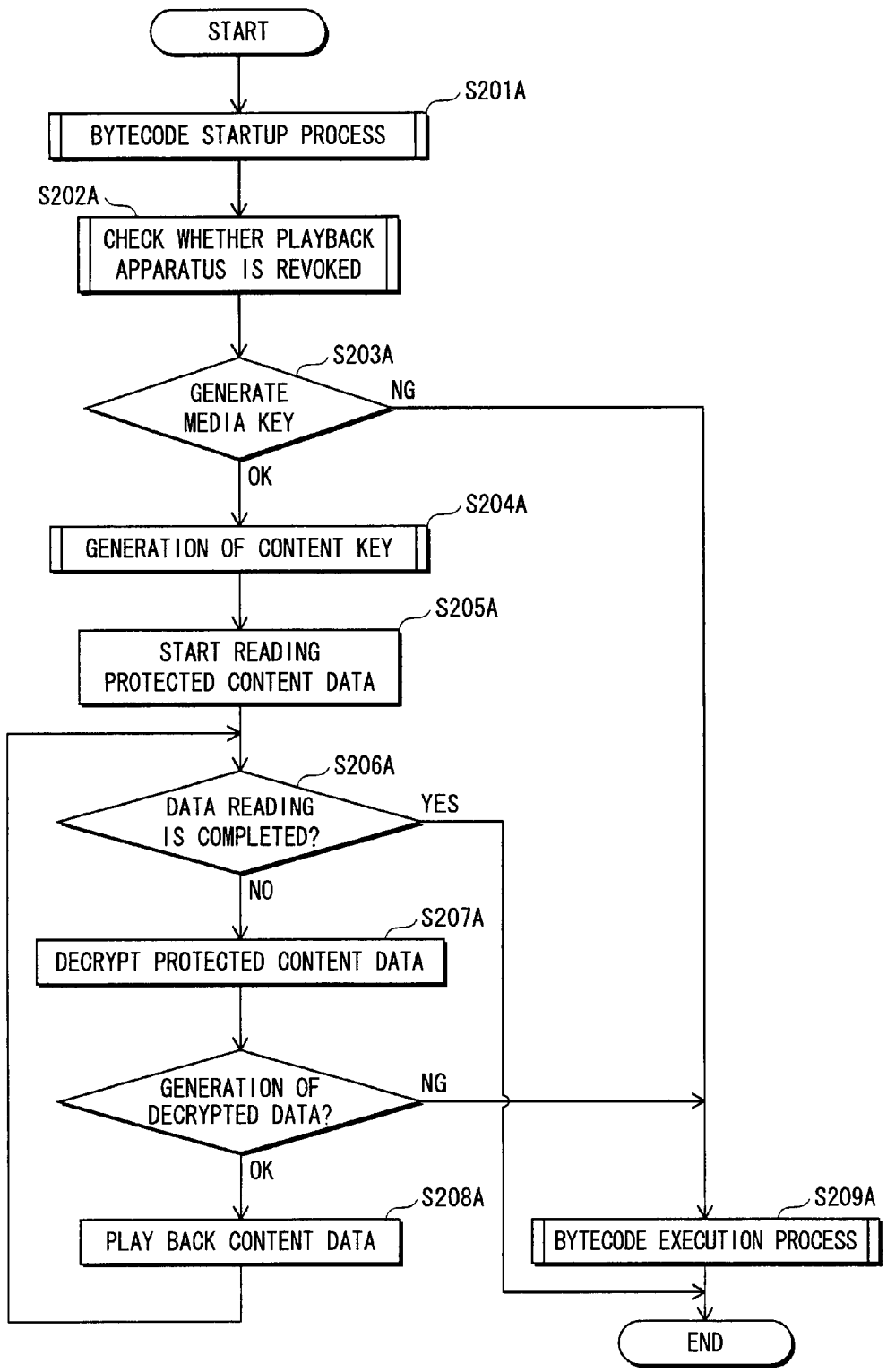
FIG. 8 is a flowchart showing operations of a content playback process according to Embodiment 2.

The following describes a content playback process with reference to FIG. 8.

First, the content playback process starts when a user's request for content playback start is received at the user operation reception unit 123A.

When the user operation reception unit 123A receives a content playback request, the content playback apparatus 102A reads the bytecode 112A from the recording medium 101A, and the bytecode 112A is started by the bytecode execution unit 124A (Step S201A). The detailed description of the process performed by the bytecode execution unit 124A is given later.

The revocation information processing unit 131A performs the revocation confirmation process of the content playback apparatus 102A (S202A). The detail of the revocation confirmation process is described later.

The subsequent process branches depending on whether the generation of the media key in the revocation confirmation process S202A is successful or not (S203A).

When the generation of the media key in the revocation confirmation process S202A is successful, the content playback apparatus 102A reads the encrypted content key 114A from the recording medium 101A and generates a content key (S204A). The detail of the content key generation is described later.

If the generation of the media key in the revocation confirmation process S202A fails, apparatus state information (1A) indicating revoked state due to the failure in the acquisition of the media key is notified to the apparatus state information acquisition unit 136A as apparatus state information. When notified of the apparatus state information (1A), the apparatus state information acquisition unit 136A notifies the bytecode execution unit 124A of the apparatus state information (1A) (S209A). The process performed by the bytecode execution unit 124A after the notification of the apparatus state information (1A) is described later.

After the completion of S204A, in order to play back a content requested by the user, the playback control unit 122A instructs a start of reading the protected content data 113A, which is to be a playback target, in accordance with the playback control information 111A (S205A).

Until all the protected content data 113A is read, the following process is repeated (S206A).

Using the content key generated by the content key generation unit 130A, the decryption unit 125A performs a decryption process on the protected content data 113A read from the recording medium 101A (S207A).

At this point, if the decryption is not properly performed for some reason (for example, a right content key was not generated by the content key generation unit 130A), apparatus state information (2A) indicating decryption anomalous state due to the failure in the acquisition of the content key is notified to the apparatus state information acquisition unit 136A as apparatus state information. When notified of the apparatus state information (2A), the apparatus state information acquisition unit 136A notifies the bytecode execution unit 124A of the apparatus state information (2A) (S209A). The process performed by the bytecode execution unit 124A after the notification of the apparatus state information (2A) is described later.

AES (Advanced Encryption Standard) is used for the encryption of the protected content data 113A; however, the present invention is not limited to this. The decrypted content data is MPEG2-TS data in plain text, which is then demultiplexed into video and audio streams by the demultiplexing unit 127A. These video and audio streams are sent to the video decoder 128A and audio decoder 129A, respectively, and subsequently output to a video-audio apparatus, such as a TV (S208A).

During the playback of the content, the decryption of the protected content data 113A (S207A) is performed in parallel.

At the completion of reading all the protected content data 113A corresponding to the content requested by the user, the content playback process ends (S206A).

Thus concludes the description of the content playback process.

Note that the procedure of the content playback process shown here is merely one example; the present invention is not limited to this.

ByteCode Execution Process

The bytecode stored in the recording medium includes an anomalous-state table listing therein apparatus state information and messages for respective apparatus states.

FIG. 9 shows an example of the anomalous-state table. As shown in FIG. 9, the apparatus state information includes: apparatus state information (1A) indicating revoked state due to failure in acquisition of the media key; apparatus state information (1B) indicating revoked state due to other failure—i.e. anomaly in acquisition of information that indicates it is a legitimate playback apparatus; apparatus state information (2A) indicating decryption anomalous state due to anomaly in acquisition of the content key; and apparatus state information (2B) indicating decryption anomalous state due to other failure—i.e. anomaly in acquisition of information required for content playback. In the anomalous-state table, messages can be set that inform the user of the state of the playback apparatus and/or what action for playback should be taken.

The bytecode 112A stored in the recording medium 101A further includes: an acquisition step of acquiring apparatus state information from the apparatus state information acquisition unit 136A of the content playback apparatus 102A; a judging step of judging whether the acquired apparatus state information is included in the anomalous-state table described above; and a display request step of, when the acquired apparatus state information is judged, in the judging step, to be included in the anomalous-state table, requesting the content playback apparatus 102A to display a message for the state of the apparatus, which is set in the anomalous-state table.

Figure 10:
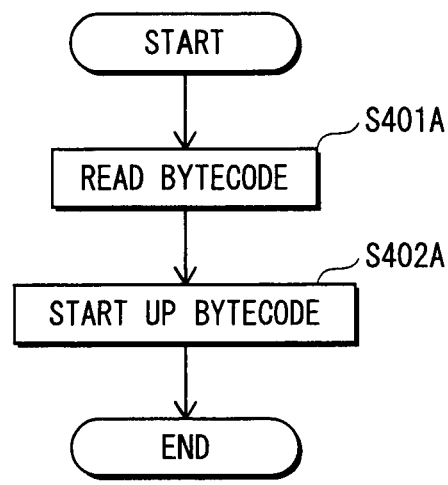
FIG. 10 is a flowchart showing operations of a bytecode startup process according to Embodiment 2.

The following describes the bytecode startup process with reference to FIG. 10. Note that this process is the detail of S201A in FIG. 8.

The bytecode execution unit 124A reads the bytecode 112A from the recording medium 101A (S401A). Then, the bytecode execution unit 124A starts the bytecode 112A (S402A).

Figure 11:
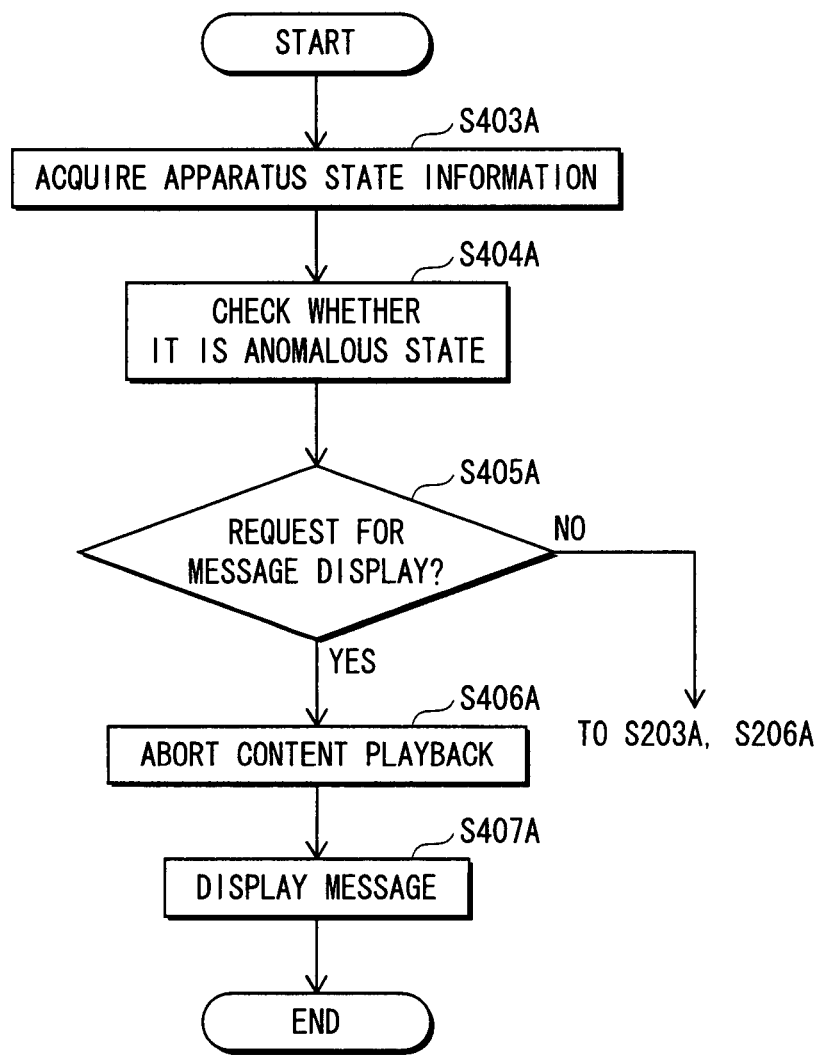
FIG. 11 is a flowchart showing operations of a bytecode execution process according to Embodiment 2.

The following describes the bytecode execution process with reference to FIG. 11. Note that this process is the detail of S209A in FIG. 8.

The bytecode execution unit 124A acquires apparatus state information from the apparatus state information acquisition unit 136A of the content playback apparatus 102A (S403A).

The bytecode execution unit 124A executes the acquired bytecode 112A to thereby judge whether the apparatus state information acquired in S403A is included in the anomalous-state table (S404A).

In the case of FIG. 9, if the apparatus state information acquired in S403A matches the apparatus state information of (1) in the anomalous-state table of FIG. 9—i.e. if the apparatus state information acquired in S403A corresponds to (1A) "the revoked state due to failure in acquisition of the media key," a request for displaying the message of (1) is made.

Then, when judging in S404A that the apparatus state information is included in the anomalous-state table, the bytecode execution unit 124A transmits a request for displaying a message for the state of the apparatus together with the message to the display control unit 134A of the content playback apparatus 102A; when judging that the apparatus state information is not included in the anomalous-state table, the bytecode execution unit 124A refrains from transmitting the request for displaying a message for the state of the apparatus (S405A).

Next, when receiving a request for displaying a message from the bytecode execution unit 124A, the display control unit 134A of the playback apparatus 102A indicates the display unit 135A to display the message and ends the content playback process (S406A). The display unit 135A displays the message (S407A).

On the other hand, when not receiving a request for displaying a message from the bytecode execution unit 124A, the display control unit 134A of the content playback apparatus 102A carries on the content playback process (to S203A, S206A).

It is a copyright holder of the content that selects the bytecode 112A to be stored in the recording medium 101A. Thereby, the copyright holder is capable of having control of displaying a predetermined message for a playback apparatus in specific anomalous state.

Thus concludes the description of the bytecode execution process.

Revocation Confirmation Process of Content Playback Apparatus 102A

Since the revocation confirmation process of the content playback apparatus 102A is the same as that of the content playback apparatus 102 of Embodiment 1, the description is omitted here.

Content Key Generation Process

Since the content key generation process is the same as that of Embodiment 1, the description is omitted here.

Other Modifications

The present invention has been described based on the above embodiments; it is however a matter of course that the present invention is not limited to these embodiments. The following cases are also within the scope of the present invention.

(1) Embodiment 1 has a structure that stops, when the playback apparatus is judged as an anomalous apparatus, the playback of the content and displays only a message; however, the present invention is not limited to this structure. For example, in the case where the user has no malicious intent—e.g. the playback apparatus has been manufactured by a manufacturer with malicious intent, or in the case where a message to be displayed is firmware update notification, a message may be displayed over the content being played back in the case when the playback apparatus is judged as an anomalous apparatus. Alternatively, the bytecode may be made to also include control information that indicates whether to stop the content playback or to display a message over the content being played back, and the playback apparatus switches, based on the control information, between stopping the content playback and displaying a message over the content being played back.

Similarly, Embodiment 2 has a structure that stops, when the playback apparatus is judged as an anomalous state, the playback of the content and displays only a message; however, the present invention is not limited to this structure. For example, in the case where the user has no malicious intent, a message may be displayed over the content being played back in the case when the playback apparatus is judged as being in anomalous state. Alternatively, the bytecode may be made to also include control information that indicates whether to stop the content playback or to display a message over the content being played back, and the playback apparatus switches, based on the control information, between stopping the content playback and displaying a message over the content being played back.

(2) Embodiment 1 has a structure in which the judgment of whether an anomalous apparatus or not is made based on the apparatus unique information and a message is displayed accordingly; however, the present invention is not limited to the apparatus unique information.

Also, Embodiment 2 has a structure in which the judgment of whether anomalous state or not is made based on the apparatus state information and a message is displayed accordingly; however, the present invention is not limited to the apparatus state information.

For example, the bytecode may be structured in such a way as to request the playback apparatus to display a predetermined message if other information received from the playback apparatus—e.g. content associated information (including license information) and/or user information (including user input information)—satisfies a predetermined condition.

This structure produces an effect that the message to be displayed can be dynamically changed according to the absence or presence of the license information of the content and attributes of the user.

(3) Embodiment 2 has a structure in which an appropriate message is displayed in the case where acquisition of the media key is failed; however, the present invention is not limited to this structure. For example, an appropriate message may be displayed in the case where acquisition of other (another) information indicating that it is a compliant playback apparatus is failed (the case of the apparatus state information (1B) of FIG. 9).

Also, Embodiment 2 has a structure in which an appropriate message is displayed in the case where generation of the decrypted data is failed; however, the present invention is not limited to this structure. For example, in the case where the protected content has been generated by performing some conversion process on the content and then encrypting the converted content with the use of a content key, the decryption unit 125A of the playback apparatus first decrypts the protected content using the content key, and then an inverse conversion process which is inverse to the above conversion process is performed the decrypted content. In this case, an appropriate message may be displayed if the inverse conversion process is not properly performed due to failure in acquisition of information necessary for the inverse conversion process (the case of the apparatus state information (2B) of FIG. 9).

(4) Specifically speaking, each apparatus above is a computer system composed of a microprocessor, ROM, RAM, a hard disk unit, a display unit, a keyboard, a mouse and the like. A computer program is stored in the RAM or the hard disk unit. The microprocessor operates according to the computer program, and thereby each apparatus fulfills its functions. Here, the computer program is structured by combining multiple instruction codes indicating commands to the computer to achieve predetermined functions.

(5) Part or all of the components making up the above individual apparatuses may be assembled as a single system LSI (Large Scale Integration). The system LSI is an ultra-multifunctional LSI produced by integrating multiple components on one chip, and more specifically, is a computer system composed of a microprocessor, ROM, RAM, and the like. A computer program is stored in the RAM. The microprocessor operates according to the computer program, and thereby the system LSI accomplishes its function.

(6) Each element, part or all of the components making up the above individual apparatuses may be assembled as an IC card detachable from a device, or as a single module. The IC card/module is a computer system composed of a microprocessor, ROM, RAM, and the like. The IC card/module may include therein the above-mentioned ultra-multifunctional LSI. The microprocessor operates according to a computer program, and thereby the IC card/module accomplishes its function. The IC card/module may be tamper resistant.

(7) The present invention may be a method of accomplishing the above-described system. The present invention may be a computer program that achieves the method by a computer, or may be a digital signal representing the computer program.

The present invention may also be achieved by a computer-readable recording medium, such as a flexible disk, a hard disk, a CD-ROM, an MO disk, a DVD, a DVD-ROM, a DVD-RAM, a BD (Blu-ray Disc), or a semiconductor memory, on which the above-mentioned computer program or digital signal is recorded. The present invention may also be the computer program or the digital signal recorded on such a storage medium.

The present invention may also be the computer program or digital signal to be transmitted via networks, as represented by telecommunications, wire/wireless communications, and the Internet, or via data broadcasting.

The present invention may also be a computer system having a microprocessor and memory, wherein the memory stores the computer program and the microprocessor operates according to the computer program.

The computer program or digital signal may be recorded on the above storage medium and transferred to an independent computer system, or alternatively, may be transferred to an independent computer system via the above network. Then, the independent computer system may execute the computer program or digital signal.

(8) The present invention includes a structure in which two or more of the above embodiments and modifications are combined.

<Additional Particulars>

(1) Structure of Recording Medium 101

The following presents a supplementary description of the structure of the recording medium 101 of Embodiment 1.

The recording medium 101 includes, as shown in FIG. 1: the playback control information 111; the bytecode 112; the protected content data 113; the encrypted content key 114; and the revocation information 115.

(1.1) Bytecode 112

The bytecode 112 includes, for example, a JAVA (registered trademark) byte code, and an executable code composed of fixed-length instruction sets.

As described above, the bytecode 112 includes: an anomalous-apparatus table shown in FIG. 3; an acquisition step of acquiring apparatus unique information from the apparatus unique information storage unit 133 of the content playback apparatus 102; a judging step of judging whether the acquired apparatus unique information is included in the anomalous-apparatus table described above; and a display request step of, when the acquired apparatus unique information is judged, in the judging step, to be included in the anomalous-apparatus table, requesting the content playback apparatus 102 to display a message for the apparatus, which is set in the anomalous-apparatus table.

Here, the acquisition step acquires apparatus unique information by interacting the content playback apparatus 102. Note that "interacting the content playback apparatus 102" means information interaction between the bytecode 112 and a program different from the bytecode 112 executed by the bytecode execution unit 124 of the content playback apparatus 102—e.g. a program including Steps S401-403, 406, and 407 of FIG. 4.

(1.2) Protected Content Data 113

The protected content data 113 is data created by performing, with the use of a content key, an encryption process on MPEG2-TS data in plain-text which is able to output video using a decoder. An encryption method used here is secret key cryptography.

(1.3) Encrypted Content Key 114

The encrypted content key 114 is data created by, with the use of a media key, encrypting the content key used for decrypting the protected content data. An encryption method used here is secret key cryptography.

(1.4) Revocation Information 115

The revocation information 115 is, as described above, a list itemizing encrypted media keys, each of which corresponds to a device key assigned to an individual content playback apparatus, and key ID numbers.

Here, encrypted media keys and key ID numbers corresponding to device keys assigned to revoked content playback apparatuses have been removed from the list.

Herewith, only a legitimate content playback apparatus (i.e. a content playback apparatus having not been revoked) is capable of decrypting the encrypted media key using the revocation information 115 and the device key assigned to the apparatus and acquiring the media key.

Figures 12, 13:
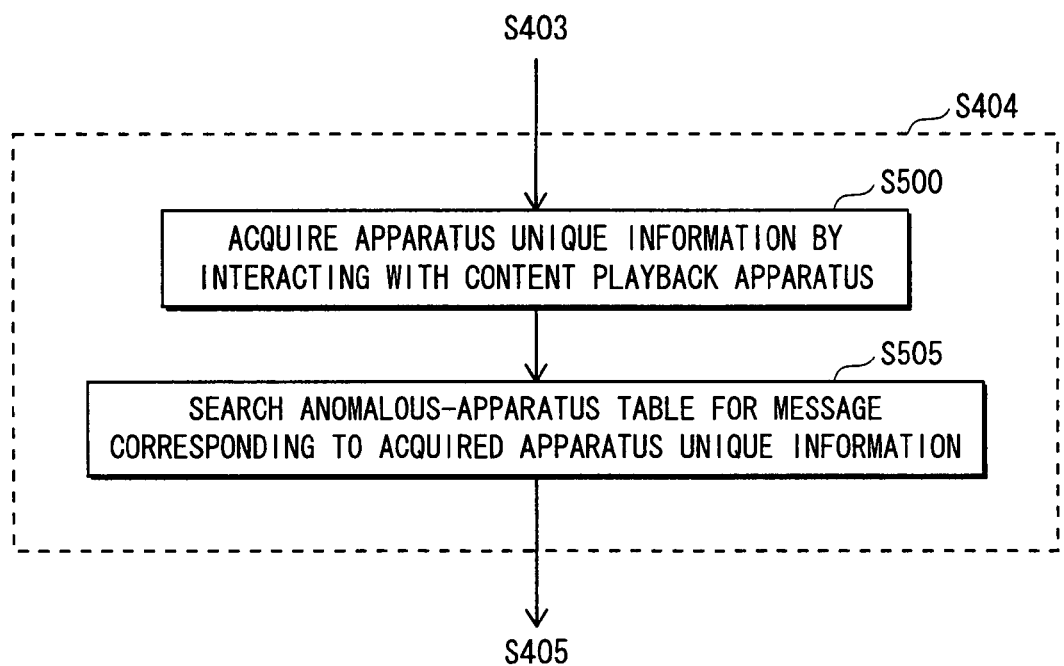
FIG. 12 shows a specific example of revocation information 115.
FIG. 13 is a flowchart showing detailed operations of Step S404.

An encryption method used here is secret key cryptography. FIG. 12 shows a specific example of the revocation information 115.

Here, device keys are denoted as DK1, DK2, . . . , and DKn; key IDs as K1, K2, . . . , and Kn; and a media key as MK. Enc(x, y) means information generated by encrypting "y" using secret key cryptography and "x".

In FIG. 12, a content playback apparatus to which a key ID "K3" has been assigned has been revoked. A content playback apparatus to which a key ID "K1" is a legitimate apparatus (i.e. unrevoked apparatus), and therefore is able to decrypt an encrypted media key "Enc(DK1, MK)" using the device key "DK1" corresponding to the key ID "K1".

(1.5) Playback Control Information 111

The playback control information 111 is information specifying a playback order of the protected content data 113 for the time when the content is played back.

(2) Structure of Content Playback Apparatus 102

The following presents a supplementary description of the structure of the content playback apparatus 102 of Embodiment 1.

As shown in FIG. 1, the content playback apparatus 102 comprises: a disk reading unit 121; a playback control unit 122; a user operation reception unit 123; a bytecode execution unit 124; a decryption unit 125; a demultiplexing unit 127; a video decoder 128; an audio decoder 129; a content key generation unit 130; a revocation information processing unit 131; a device key storage unit 132; an apparatus unique information storage unit 133; a display control unit 134; and a display unit 135.

Although not shown in the figure, the content playback apparatus 102 is connected to a monitor and a speaker. The content playback apparatus 102 is connected to, for example, a TV having a monitor and speakers.

(2.1) Apparatus Unique Information Storage Unit 133

The apparatus unique information storage unit 133 stores an apparatus maker ID, a model number, a manufacturing serial number, and a firm version number.

The apparatus maker ID is an identifier for identifying a maker that manufactured the content playback apparatus 102.

The model number is a number for identifying a type of the content playback apparatus 102 among one or more types of content playback apparatuses manufactured by the maker identified by the apparatus maker ID.

The manufacturing serial number is a number for identifying each of one or more content playback apparatuses having the same model number.

The firm version number is a number indicating a version of the playback process firmware incorporated in the content playback apparatus 102.

(2.2) Device Key Storage Unit 132

The device key storage unit 132 stores a device key assigned to the content playback apparatus 102 and a key ID number.

(2.3) User Operation Reception Unit 123

The user operation reception unit 123 receives a request for starting the content playback (a content playback start request) from the user, and outputs the received content playback start request to the playback control unit 122.

(2.4) Playback Control Unit 122

The playback control unit 122 controls the content playback.

When receiving a content playback start request from the user operation reception unit 123, the playback control unit 122 outputs, to the bytecode execution unit 124, a bytecode execution instruction that instructs execution of the bytecode.

When receiving, from the bytecode execution unit 124, a playback continuation instruction that instructs continuation of the content playback, the playback control unit 122 outputs, to the revocation information processing unit 131, a revocation check instruction that instructs to check whether the content playback apparatus 102 has been revoked or not.

When receiving, from the display control unit 134, a playback prohibition instruction indicating that the content playback is not allowed, the playback control unit 122 ends the content playback. This operation corresponds to the playback inhibiting unit of the present invention.

When receiving, from the revocation information processing unit 131, an apparatus revocation instruction indicating that the content playback apparatus 102 has been revoked, the playback control unit 122 ends the content playback.

When receiving, from the decryption unit 125, a playback abort instruction indicating to abort the content playback, the playback control unit 122 aborts the content playback.

(2.5) Bytecode Execution Unit 124

When receiving a bytecode execution instruction from the playback control unit 122, the bytecode execution unit 124 reads the bytecode 112 from the recording medium 101 via the disk reading unit 121. This operation corresponds to the reading unit of the present invention.

The bytecode execution unit 124 acquires the apparatus maker ID, model number, manufacturing serial number, and firm version number stored in the apparatus unique information storage unit 133. Hereinafter, a set of the apparatus maker ID, model number, manufacturing serial number, and firm version number is referred to as apparatus unique information.

The bytecode execution unit 124 starts the read bytecode 112, and thereby checks whether the content playback apparatus 102 is an anomalous apparatus or not. At this point, the bytecode execution unit 124 interacts with the bytecode 112 in execution, and whereby notifies the bytecode 112 of the acquired apparatus unique information. Note that "interacts with the bytecode 112" means information interaction between the bytecode 112 and a program different from the bytecode 112 executed by the bytecode execution unit 124—e.g. a program including Steps S401-403, 406, and 407 of FIG. 4, as described above. Here, the operation that the content playback apparatus starts the bytecode 112 corresponds to the startup unit of the present invention. Also, the operation that the content playback apparatus 102 interacts with the bytecode 112 and thereby notifies the bytecode 112 of the apparatus unique information corresponds to the interaction unit of the present invention.

When receiving a display request for a message from the bytecode 112 and a message determined in the bytecode 112, the bytecode execution unit 124 outputs the received display request and message to the display control unit 134.

When not receiving a display request and a message from the bytecode 112, the bytecode execution unit 124 outputs a playback continuation instruction to the playback control unit 122.

(2.6) Display Control Unit 134

When receiving a display request and a message from the bytecode execution unit 124, the display control unit 134 outputs a playback prohibition instruction to the playback control unit 122.

The display control unit 134 displays the received message on the monitor via the display unit 135.

(2.7) Display Unit 135

The display unit 135 displays, on the monitor, a message received from the display control unit 134. The operation of the display unit 135 corresponds to an example of the processing unit of the present invention.

(2.8) Revocation Information Processing Unit 131

When receiving a revocation check instruction from the playback control unit 122, the revocation information processing unit 131 acquires the device key and key ID number from the device key storage unit 132.

The revocation information processing unit 131 reads the revocation information 115 from the recording medium 101 via the disk reading unit 121, and checks, using the read revocation information 115 and the acquired key ID number, whether the content playback apparatus 102 has been revoked.

When judging that it has been revoked, the revocation information processing unit 131 outputs an apparatus revocation instruction to the playback control unit 122.

When judging that it has not been revoked, the revocation information processing unit 131 generates a media key by decrypting the encrypted media key using the read revocation information 115 and the acquired device key and key ID number. The revocation information processing unit 131 outputs the generated media key to the content key generation unit 130.

(2.9) Content Key Generation Unit 130

When receiving a media key from the revocation information processing unit 131, the content key generation unit 130 reads the encrypted content key 114 from the recording medium 101 via the disk reading unit 121.

The content key generation unit 130 decrypts the read encrypted content key using the media key to thereby generate a content key.

The content key generation unit 130 outputs the generated content key to the decryption unit 125.

(2.10) Decryption Unit 125

When receiving a content key from the content key generation unit 130, the decryption unit 125 sequentially reads the protected content data 113 from the recording medium 101 via the disk reading unit 121, based on the playback control information 111.

The decryption unit 125 decrypts the read protected content data 113 using the content key, generates content data, and outputs the generated content data to the demultiplexing unit 127.

When reading of all protected content data to be played back is completed, the decryption unit 125 outputs a playback end instruction to the playback control unit 122.

(2.11) Demultiplexing Unit 127

When receiving content data from the decryption unit 125, the demultiplexing unit 127 demultiplexes the content data into video and audio streams, and outputs the video stream to the video decoder 128 and the audio stream to the audio decoder 129.

(2.12) Video Decoder 128

When receiving a video stream from the demultiplexing unit 127, the video decoder 128 decodes the received video stream to thereby generate video data, and outputs the generated video data to the monitor.

(2.13) Audio Decoder 129

When receiving an audio stream from the demultiplexing unit 127, the audio decoder 129 decodes the received audio stream to thereby generate audio data, and outputs the generated audio data to the speakers.

(2.14) Disk Reading Unit 121

The disk reading unit 121 is able to access the recording medium 101, and reads data recorded on the recording medium 101.

(3) Operation of Content Playback Apparatus 102

The following presents a supplementary description of the bytecode execution process shown in FIG. 4.

(3.1) Details of Step S404

Detailed operations of Step S404 shown in FIG. 4 are described with the use of the flowchart of FIG. 13.

The bytecode 112 acquires apparatus unique information by interacting with the content playback apparatus 102 (Step S500). This operation corresponds to the acquisition step included in the bytecode 112. At this point, the bytecode execution unit 124 notifies the acquired apparatus unique information to the bytecode 112. Here, the interaction between the bytecode 112 and the content playback apparatus 102 means information interaction between the bytecode 112 and a program different from the bytecode 112 executed by the bytecode execution unit 124—e.g. a program including Steps S401-403, 406, and 407 of FIG. 4, as described above. At this point also, the content playback apparatus 102 notifies the apparatus unique information to the bytecode 112 by the interaction, and this operation corresponds to the interaction step of the present invention.

The bytecode 112 searches the anomalous-apparatus table for a message corresponding to the acquired apparatus unique information (Step S505).

(3.2) Details of Step S405

Detailed operations of Step S405 shown in FIG. 4 are described with the use of the flowchart of FIG. 14.

According to the result of the search of Step S505, the bytecode 112 judges whether the message is present (Step S550). This operation corresponds to the judging step included in the bytecode 112. Note that the operation composed of Steps S505 and S550 may be the judging step, instead.

When determining that the message is present ("YES" in Step S550), the bytecode 112 acquires the message corresponding to the acquired apparatus unique information (Step S555). The bytecode 112 outputs the acquired message and a display request to the bytecode execution unit 124 of the content playback apparatus 102 (Step S560). This operation corresponds to the display request step included in the bytecode 112. Note that the operation composed of Steps S555 and S560 may be the display request step, instead.

When determining that the message is absent ("NO" in Step S550) the bytecode 112 ends the process, and thereby the bytecode execution unit 124 of the content playback apparatus 102 outputs a playback continuation instruction to the playback control unit 122. Herewith, the content playback apparatus 102 moves to Step S202.

As to operations after Step S560, when receiving a message and a display request from the bytecode 112, the bytecode execution unit 124 of the content playback apparatus 102 outputs the received message and display request to the display control unit 134. Herewith, the content playback apparatus performs Step S406 and the subsequent process.

(4) Structure of Recording Medium 101A

The following presents a supplementary description of the structure of the recording medium 101A of Embodiment 2.

The recording medium 101A includes, as shown in FIG. 7: the playback control information 111A; the bytecode 112A; the protected content data 113A; the encrypted content key 114A; and the revocation information 115A.

The playback control information 111A, protected content data 113A, encrypted content key 114A, and revocation information 115A are the same as the playback control information 111, protected content data 113, encrypted content key 114, and revocation information 115, respectively, and therefore, their descriptions are omitted here.

The following explains the bytecode 112A.

As described above, the bytecode 112A stored in the recording medium 101A includes: an anomalous-state table shown in FIG. 9; an acquisition step of acquiring apparatus state information from the apparatus state information acquisition unit 136A of the content playback apparatus 102A; a judging step of judging whether the acquired apparatus state information is included in the anomalous-state table described above; and a display request step of, when in the judging step the acquired apparatus state information is judged to be included in the anomalous-state table, requesting the content playback apparatus 102A to display a message for the state of the apparatus which is set in the anomalous-state table.

Here, the acquisition step acquires apparatus state information by interacting with the content playback apparatus 102A. Note that "interacting with the content playback apparatus 102A" means information interaction between the bytecode 112A and a program different from the bytecode 112A executed by the bytecode execution unit 124A of the content playback apparatus 102A—e.g. a program including Steps 403A, 406A, and 407A of FIG. 11.

(5) Content Playback Apparatus 102A

The content playback apparatus 102A, as shown in FIG. 7, comprises: a disk reading unit 121A; a playback control unit 122A; a user operation reception unit 123A; a bytecode execution unit 124A; a decryption unit 125A; a demultiplexing unit 127A; a video decoder 128A; an audio decoder 129A; a content key generation unit 130A; a revocation information processing unit 131A; a device key storage unit 132A; a display control unit 134A; a display unit 135A; and an apparatus state information acquisition unit 136A.

(5.1) Device Key Storage Unit 132A

Since the device key storage unit 132A is the same as the device key storage unit 132, the description is omitted here.

(5.2) User Operation Reception Unit 123A

Since the user operation reception unit 123A is the same as the user operation reception unit 123, the description is omitted here.

(5.3) Playback Control Unit 122A

The playback control unit 122A controls the content playback.

When receiving a content playback start request from the user operation reception unit 123A, the playback control unit 122A outputs, to the bytecode execution unit 124A, a bytecode startup instruction that instructs startup of the bytecode.

When receiving a startup completion instruction that indicates completion of startup of the bytecode 112A, the playback control unit 122A outputs, to the revocation information processing unit 131A, a revocation check instruction that instructs to check whether the content playback apparatus 102A has been revoked or not.

When receiving, from the display control unit 134A, a playback canceling instruction indicating to cancel the content playback, the playback control unit 122A ends the content playback. This operation corresponds to the playback inhibiting unit of the present invention.

When receiving a playback end instruction from the decryption unit 125A, the playback control unit 122A ends the content playback.

(5.4) Apparatus State Information Acquisition Unit 136A

The apparatus state information acquisition unit 136A acquires, as apparatus state information, result of the process performed by the revocation information processing unit 131A. The apparatus state information acquisition unit 136A stores the acquired apparatus state information. The result of the process performed by the revocation information processing unit 131A is, for example, a code indicating whether the process ended normally, and also indicating, in the case where the process ended abnormally, the type of the trouble. "1A" and "1B" of FIG. 9 represent codes for abnormal ends.

The apparatus state information acquisition unit 136A acquires, as apparatus state information, result of the process performed by the decryption unit 125A. The apparatus state information acquisition unit 136A stores the acquired apparatus state information. The result of the process performed by the revocation information processing unit 131A is, for example, a code indicating whether the process ended normally (an error code), and also indicating, in the case where the process ended abnormally, the type of the trouble. "2A" and "2B" of FIG. 9 represent codes for abnormal ends.

Here, the apparatus state information acquisition unit 136A stores therein only the latest apparatus state information, discarding other apparatus state information. That is, when acquiring one piece of apparatus state information, the apparatus state information acquisition unit 136A deletes apparatus state information having been stored therein up to that point.

(5.5) Bytecode Execution Unit 124A

When receiving a bytecode execution instruction from the playback control unit 122A, the bytecode execution unit 124A reads the bytecode 112 from the recording medium 101A via the disk reading unit 121A. This operation corresponds to the reading unit of the present invention.

The bytecode execution unit 124A starts the read bytecode 112A. At this point, the bytecode 112A is in a state of waiting an input.

When startup of the bytecode 112A is completed, the bytecode execution unit 124A outputs a startup completion instruction to the playback control unit 122A.

When receiving, from the revocation information processing unit 131A, an apparatus revocation instruction indicating that the content playback apparatus 102A has been revoked, the bytecode execution unit 124A acquires apparatus state information from the apparatus state information acquisition unit 136A. The bytecode execution unit 124A provides, as information, the acquired apparatus state information to the running bytecode 112A, and thereby checks whether the content playback apparatus 102A is in an anomalous state. At this point, the bytecode execution unit 124A interacts with the bytecode 112A in execution, and whereby notifies the acquired apparatus state information to the bytecode 112A. Note that "interacts with the bytecode 112A" means information interaction between the bytecode 112A and a program different from the bytecode 112A executed by the bytecode execution unit 124A of the content playback apparatus 102A—e.g. a program including Steps S403A, 406A, and 407A of FIG. 11, as described above. Here, the operation that the content playback apparatus starts the bytecode 112A corresponds to the startup unit of the present invention. Also, the operation that the content playback apparatus 102A interacts with the bytecode 112A and thereby notifies the apparatus state information to the bytecode 112A corresponds to the interaction unit of the present invention.

Also, when receiving, from the decryption unit 125A a decryption failure instruction indicating that decryption of the protected content data has been failed, the bytecode execution unit 124A acquires apparatus state information from the apparatus state information acquisition unit 136A. The bytecode execution unit 124A provides, as information, the acquired apparatus state information to the running bytecode 112A, and thereby checks whether the content playback apparatus 102A is in an anomalous state.

When receiving a display request for a message from the bytecode 112A and a message determined in the bytecode 112, the bytecode execution unit 124A outputs the received display request and message to the display control unit 134A.

When not receiving a display request and a message from the bytecode 112, the bytecode execution unit 124A outputs a process continuation instruction indicating to continue the process to a source that has output the instruction (i.e. the revocation information processing unit 131A or the decryption unit 125A).

(5.6) Display Control Unit 134A

When receiving a display request and a message from the bytecode execution unit 124A, the display control unit 134A outputs a playback prohibition instruction to the playback control unit 122A.

The display control unit 134A displays the received message on the monitor via the display unit 135A.

(5.7) Display Unit 135A

The display unit 135A displays, on the monitor, a message received from the display control unit 134A. The operation of the display unit 135A corresponds to an example of the processing unit of the present invention.

(5.8) Revocation Information Processing Unit 131A

When receiving a revocation check instruction from the playback control unit 122A, the revocation information processing unit 131A acquires the device key and key ID number from the device key storage unit 132A.

The revocation information processing unit 131A reads the revocation information 115A from the recording medium 101A via the disk reading unit 121A, and checks, using the read revocation information 115A and the acquired key ID number, whether the content playback apparatus 102A has been revoked.

When judging that it has been revoked, the revocation information processing unit 131 issues error code indicating the type of the trouble that led to the abnormal end, and outputs the issued error code to the apparatus state information acquisition unit 136A. The revocation information processing unit 131A outputs an apparatus revocation instruction to the bytecode execution unit 124A.

When judging that it has not been revoked, the revocation information processing unit 131A issues a code indicating that the process has ended normally, and outputs the issued code to the apparatus state information acquisition unit 136A. The revocation information processing unit 131A decrypts the encrypted media key using the read revocation information 115A and the acquired device key and key ID number to generate a media key. The revocation information processing unit 131A outputs the generated media key to the content key generation unit 130A.

When receiving a process continuation instruction from the bytecode execution unit 124A, the revocation information processing unit 131A continues the process.

(5.9) Content Key Generation Unit 130A

The content key generation unit 130A is the same as the content key generation unit 130, the description is omitted here.

(5.10) Decryption Unit 125A

When receiving a content key from the content key generation unit 130A, the decryption unit 125A sequentially reads the protected content data 113A from the recording medium 101A via the disk reading unit 121A, based on the playback control information 111A.

The decryption unit 125A decrypts the read protected content data 113A using the content key, generates content data, and outputs the generated content data to the demultiplexing unit 127A. Here, if failing decryption of the protected content data 113A, the decryption unit 125A outputs an appropriate error code to the apparatus state information acquisition unit 136A and outputs a decryption failure instruction to the bytecode execution unit 124A. When succeeding the decryption of the protected content data 113A, the decryption unit 125A outputs an appropriate code to the apparatus state information acquisition unit 136A and continue the process.

When reading of all protected content data to be played back is completed, the decryption unit 125A outputs a playback end instruction to the playback control unit 122A.

When receiving a process continuation instruction from the bytecode execution unit 124A, the decryption unit 125A continues the process.

(5.11) Demultiplexing Unit 127

Since the demultiplexing unit 127A is the same as the demultiplexing unit 127, the description is omitted here.

(5.12) Video Decoder 128A

Since the video decoder 128A is the same as the video decoder 128, the description is omitted here.

(5.13) Audio Decoder 129A

Since the audio decoder 129A is the same as the audio decoder 129, the description is omitted here.

(5.14) Disk Reading Unit 121A

Since the demultiplexing unit 127A is the same as the demultiplexing unit 127, the description is omitted here.

(6) Operation of Content Playback Apparatus 102A

The following presents a supplementary description of the bytecode execution process shown in FIG. 11.

(6.1) Details of Step S404A

Detailed operations of Step S404 shown in FIG. 11 are described with the use of the flowchart of FIG. 15.

The bytecode 112A acquires apparatus state information by interacting with the content playback apparatus 102A (Step S500A). This operation corresponds to the acquisition step included in the bytecode 112A. At this point, the bytecode execution unit 124A notifies the acquired apparatus state information to the bytecode 112A. Here, the interaction between the bytecode 112A and the content playback apparatus 102A means information interaction between the bytecode 112A and a program different from the bytecode 112A executed by the bytecode execution unit 124A—e.g. a program including Steps S403A, 406A, and 407A of FIG. 11, as described above. At this point also, the content playback apparatus 102A notifies the apparatus state information to the bytecode 112A by the interaction, and this operation corresponds to the interaction step of the present invention.

The bytecode 112A searches the anomalous-state table for a message corresponding to the acquired apparatus state information (Step S505A).

(6.2) Details of Step S405A

Figure 16:
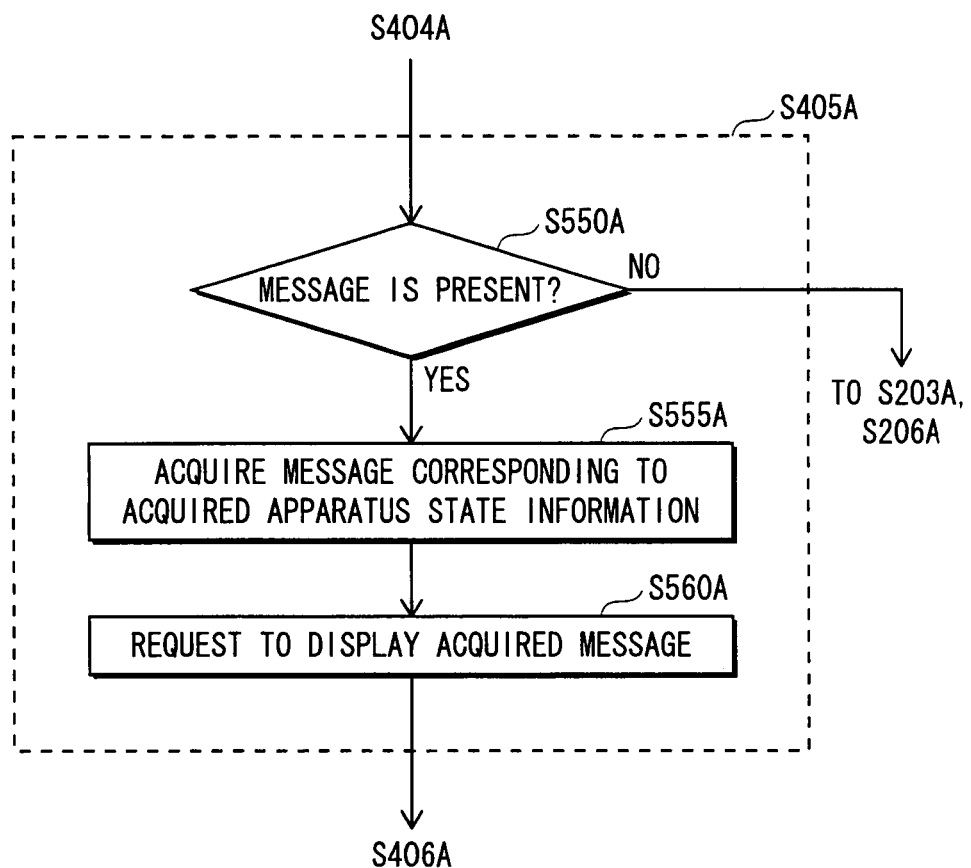
FIG. 16 is a flowchart showing detailed operations of Step S405A.

Detailed operations of Step S405A shown in FIG. 11 are described with the use of the flowchart of FIG. 16.

According to the result of the search of Step S505A, the bytecode 112A judges whether the message is present (Step S550A). This operation corresponds to the judging step included in the bytecode 112A. Note that the operation composed of Steps S505A and S550A may be the judging step, instead.

When determining that the message is present ("YES" in Step S550A), the bytecode 112A acquires the message corresponding to the acquired apparatus state information (Step S555A). The bytecode 112A outputs the acquired message and a display request to the bytecode execution unit 124A of the content playback apparatus 102A (Step S560A). This operation corresponds to the display request step included in the bytecode 112A. Note that the operation composed of Steps S555A and S560A may be the display request step, instead.

When determining that the message is absent ("NO" in Step S550A), the bytecode 112A ends the process. The bytecode execution unit 124A of the content playback apparatus 102A then outputs a process continuation instruction indicating continuation of the process to a source of calling the bytecode execution process (i.e. the revocation information processing unit 131A or the decryption unit 125A). Herewith, the content playback apparatus 102 moves to Step S203A or Step S206A.

As to operations after Step S560A, when receiving a message and a display request from the bytecode 112A, the bytecode execution unit 124A of the content playback apparatus 102A outputs the received message and display request to the display control unit 134A. Herewith, the content playback apparatus performs Step S406A and the subsequent process.

(7) Modifications (7.1) In Embodiment 2, the messages for display are associated with error codes; however, the present invention is not limited to this case.

The error codes may be associated with state identification information that identifies events taking place when the content playback apparatus is in operation.

Accordingly, if an event that was not envisioned at the time of manufacture occurs during the operation, it is possible to treat the event as an error even after the shipment of the content playback apparatus.

Such an event occurring during the operation is, for example, the speed of fast-forwarding during the playback reaches its performance limit. Another example is an event of decryption failure. In Embodiment 2, the content playback apparatus performs a two-stage decryption (decryption of the encrypted content key, and decryption of the protected content data) on the content. Here, if a three-stage encryption has been performed on the content of the recording medium, the two-stage decryption cannot be performed on it.

(7.2) In Embodiment 1 above, in the case of displaying a message corresponding to apparatus unique information of the content playback apparatus, the playback control unit of the content playback apparatus stops (aborts) the content playback; however, the present invention is not limited to this.

A playback stop step for stopping (aborting) the content playback may be included in the bytecode in the case of displaying a message. Here, the content playback apparatus can inhibit the content playback by executing the playback stop step during the execution of the bytecode. Herewith, the bytecode is capable of having the content playback apparatus inhibit the content playback.

Similarly, in the case of overlay display of a message, an overlay display step for displaying a message over the content being played back may be included in the bytecode. Here, the bytecode execution unit of the content playback apparatus executes the overlay display step during the execution of the bytecode, and thereby the display unit is capable of displaying a message over the content being played back.

In addition, in the case of switching between stopping the content playback and realizing overlay display, a switching step may be included in the bytecode. In the switching step, a user instruction is received, and either inhibiting of the content playback or overlay display of a message is performed in accordance with the received instruction. Here, the content playback apparatus executes the switching step during the execution of the bytecode, and thereby receives an instruction from the user and performs either inhibition of the content playback or overlay display of a message in accordance with the received instruction. Herewith, the bytecode is capable of having the content playback apparatus take control to perform either inhibition of the content playback or overlay display of a message.

In the case of including control information in the bytecode as described in (1) under Other Modifications, the content playback apparatus is capable of reading the control information and performing either inhibition of the content playback or overlay display of a message based on the read control information. Alternatively, the bytecode may output the control information to the bytecode execution unit of the content playback apparatus by interacting with the content playback apparatus and perform the process based on the control information received by the bytecode execution unit. Note that "interacting with the content playback apparatus" means interaction of information between the bytecode and a program different from the bytecode 112 executed by the bytecode execution unit 124 of the content playback apparatus.

The content playback apparatus may include in advance a process control unit that takes control to perform either inhibition of the content playback or overlay display of a message. The content playback apparatus executes the operation of the process control unit in the case of receiving a message indicating that the apparatus is in an anomalous state by the interaction with the bytecode. The operation of the process control unit includes, for example, receiving from the user either an instruction for inhibiting the playback or an instruction for overlay display of a message and performing either one of them according to the received instruction. As another example, in the case where control information is recorded on the recording medium, the process control unit reads control information from the recording medium, and performs either inhibition of the content playback or overlay display of a message, based on the read control information.

Note that, similarly in Embodiment 2, the step of stopping (aborting) the content playback may be included in the bytecode. In addition, the step of displaying a message over the content being played back may be included in the bytecode. In addition, the switching step may be included in the bytecode.

Alternatively, the content playback apparatus may include in advance a process control unit that takes control to perform either inhibition of the content playback or overlay display of a message. The content playback apparatus executes the operation of the process control unit in the case of receiving a message indicating that the apparatus is in an anomalous state by the interaction with the bytecode.

(7.3) In Embodiment 1, the anomalous-apparatus table is included in the bytecode; however, the present invention is not limited to this case.

The anomalous-apparatus table may be recorded, on the recording medium, in an area different from the area recording the bytecode.

Similarly, in Embodiment 2, the anomalous-state table may be recorded, on the recording medium, in an area different from the area recording the bytecode.

(7.4) The apparatus unique information of the present invention is information including at least one of the apparatus maker ID, model number, manufacturing serial number, and firm version number stored in the apparatus unique information storage unit 133.

(7.5) The present invention includes a structure in which two or more of the above embodiments and modifications are combined.

(8) Summary

Conventional technology is able to determine an anomalous state that has been anticipated in advance (i.e. an anomalous state anticipated at the time of manufacture of a terminal apparatus, such as a content playback apparatus) and provide the user with a message corresponding to the anomalous state. However, as to an anomaly that has not been anticipated in advance (an anomalous state identified after the shipment), such as an anomalous state due to bugs, it cannot determine the anomalous state and provide the user with a message corresponding to the anomalous state.

Additionally, in the conventional technology, how to notify the user for what kind of anomalous state is generally an implementation matter specified by the terminal apparatus manufacturer. It is therefore difficult to reflect the intention of the content's copyright holder, and/or to allow the copyright holder to control such messages. Especially, the conventional technology is not capable of determining, on a terminal apparatus manufactured by a manufacturer with malicious intent, an anomalous state that has been predetermined in accordance with the desire of the copyright holder, and providing the user with a message corresponding to the anomalous state.

Contrarily, the present invention is capable of determining an anomalous state that has not been anticipated in advance and providing the user of a message corresponding to the anomalous state. Also, it is able to determine an anomalous state that has been predetermined in accordance with the desire of the content's copyright holder and provide a message corresponding to the anomalous state.

In addition, the recording medium, data processing apparatus (e.g. the content playback apparatus mentioned above), and data processing method of the present invention are useful in the field where content data that is a copyrighted work, such as a movie, is stored on a recording medium and the content data on the recording medium is played back.

(8.1) The present invention is a recording medium recording thereon a program which is read and executed by a data processing apparatus. This recording medium is characterized by the program recorded thereon which comprises the steps of: receiving information stored or acquire by the data processing apparatus; acquiring a message corresponding to the received information; and presenting a display request for the acquired message to the data processing apparatus.

(8.2) Here, as to the recording medium of (8.1) above, the information may be apparatus unique information used for identifying an unauthorized or anomalous data processing apparatus, and the message may be a message notifying the user of the data processing apparatus that the data processing apparatus is an unauthorized or anomalous one.

(8.3) Here, as to the recording medium of (8.1) above, the information may be apparatus state information indicating that the data processing apparatus is in an unauthorized or anomalous data processing state, and the message may be a message notifying the user of the data processing apparatus that the data processing apparatus is in an unauthorized or anomalous data processing state.

(8.4) The present invention is also a data processing apparatus for executing a program read from the recording medium of one of (8.1) to (8.3) above. The data processing apparatus is characterized by comprising: a reading unit operable to reading the program from the recording medium; a program executing unit operable to execute the read program; a notifying unit operable to notify stored or acquired information; and a display unit operable to display a message in accordance with a message display request received from the program.

(8.5) Here, as to the data processing apparatus of (8.4) above, the information may be apparatus unique information used for identifying an unauthorized or anomalous data processing apparatus, and the message may be a message notifying the user of the data processing apparatus that the data processing apparatus is an unauthorized or anomalous one.

(8.6) Here, as to the data processing apparatus of (8.4) above, the information may be apparatus state information indicating that the data processing apparatus is in an unauthorized or anomalous data processing state, and the message may be a message notifying the user of the data processing apparatus that the data processing apparatus is in an unauthorized or anomalous data processing state.

(8.7) The present invention is also a data processing method used on a data processing apparatus that executes a program read from a recording medium. The data processing method is characterized by comprising: a reading step in which the data processing apparatus reads the program from the recording medium; an execution step in which the data processing apparatus executes the read program; a $1^{st}$ notifying step in which the data processing apparatus notifies stored or acquired information to the executed program; a receiving step in which the program receives the information notified from the data processing apparatus; an acquisition step in which the program acquires a message corresponding to the received information; a $2^{nd}$ notifying step in which the program notifies a display request for the acquired message; and a display step in which the data processing apparatus displays the message in accordance with the display request notified from the program.

INDUSTRIAL APPLICABILITY

The recording medium and content playback apparatus described above can be used operationally, continuously and repeatedly in industries supplying contents to users, manufacturing industries that manufacture apparatuses for playing back contents, and marketing industries that market apparatuses for playing back contents.

The invention claimed is:

1. The non-transitory computer-readable recording medium provided by a content provider and having content and a program recorded thereon, the program causing a playback apparatus to execute a method comprising:
   an interacting step of interacting with a different program that is prestored in the playback apparatus for playing back the content and that is executed during a playback of the content; and
   an output step of transmitting, to the different program, a message that is (i) determined according to a result of the interaction performed by the interacting step, and (ii) to be displayed by the playback apparatus,
   wherein the different program is an execution program that is executed when the playback apparatus plays back the content,
   wherein the execution program includes two or more messages that are provided by the content provider and that are to be displayed by the playback apparatus, wherein apparatus unique information is assigned to each of a plurality of playback apparatuses, the plurality of playback apparatuses including the playback apparatus, wherein the apparatus unique information assigned to each of the plurality of apparatuses is associated with a different message of the two or more messages, wherein the interacting step acquires the apparatus unique information assigned and unique to the playback apparatus by interacting with the different program, and wherein the output step acquires one message of the two or more messages according to the apparatus unique information, and transmits the acquired message outputs, to the different program.

2. The non-transitory computer-readable recording medium of claim 1, wherein the output step includes:

an acquisition step of acquiring, according to the apparatus unique information, a message which the playback apparatus is capable of displaying; and a transmission step of transmitting the acquired message to the different program.

3. The non-transitory computer-readable recording medium of claim 2, wherein the acquisition step acquires, when the apparatus unique information indicates that the playback apparatus is an unauthorized or anomalous apparatus, a message indicating that the playback apparatus is the unauthorized or anomalous apparatus.

4. The non-transitory computer-readable recording medium of claim 1, further including a storage area storing the acquired message.

5. The non-transitory computer-readable recording medium of claim 1, wherein, when the acquired message indicates that one of (1) the playback apparatus is an unauthorized or anomalous apparatus and (2) the playback apparatus is in an unauthorized or anomalous state, the program causes the playback apparatus to execute, in addition to the output step of transmitting the acquired message, a playback inhibition step of inhibiting the playback of the content.

6. The non-transitory computer-readable recording medium of claim 1, wherein the content includes image data, wherein the playback apparatus plays back an image based on the image data, and wherein the program further causes the playback apparatus to execute an overlay display step of displaying the acquired message over the image being played back.

7. The non-transitory computer-readable recording medium of claim 1, wherein the acquired message indicates that one of (1) the playback apparatus is an unauthorized or anomalous apparatus and (2) the playback apparatus is in an unauthorized or anomalous state, and wherein the program further causes the playback apparatus to execute a process selection step of receiving, from a user, an instruction of whether to inhibit the playback of the content or to display the acquired message over an image of the content being played back.

8. The non-transitory computer-readable recording medium of claim 1, wherein the execution program includes control information indicating performing one of (1) an operation of inhibiting the playback of the content and (2) an operation of displaying the acquired message over an image of the content being played back, and wherein the output step further transmits the control information to the different program.

9. A playback apparatus for playing back content from a recording medium that is provided by a content provider, wherein the recording medium has the content and a program recorded thereon, wherein the playback apparatus comprises:

a reading unit operable to read the program from the recording medium at a time of a playback of the content;

a startup unit operable to start up and execute the read program;

an interaction unit operable to interact with the program; and a processing unit operable to receive, from the program, a message that is determined according to a result of the interaction performed by the interaction unit, and operable to perform a process in accordance with the received message, wherein the program is an execution program that is executed at the time of the playback of the content, wherein the processing unit displays the received message, wherein the execution program includes two or more messages that are provided by the content provider and that are to be displayed by the playback apparatus, wherein apparatus unique information is assigned to each of a plurality of playback apparatuses, the plurality of playback apparatuses including the playback apparatus, wherein the apparatus unique information assigned to each of the plurality of apparatuses is associated with a different message of the two or more messages, wherein the interaction unit notifies, to the execution program, the apparatus unique information assigned and unique to the playback apparatus, and wherein the message that the processing unit receives as the result of the interaction is one message of the two or more messages and is selected by the execution program according to the apparatus unique information.

10. The playback apparatus of claim 9, wherein the playback apparatus further comprises a playback inhibiting unit operable to inhibit the playback of the content in addition to displaying the message, and wherein, when the received message indicates that one of (1) the playback apparatus is an unauthorized or anomalous apparatus and (2) the playback apparatus is in an unauthorized or anomalous state, the playback inhibiting unit inhibits the playback of the content.

11. The playback apparatus of claim 9, wherein the content includes image data based on an image to be played back by the playback apparatus, and wherein the processing unit displays the message over the image being played back.

12. The playback apparatus of claim 9, wherein the message indicates that one of (1) the playback apparatus is an unauthorized or anomalous apparatus and (2) the playback apparatus is in an unauthorized or anomalous state, and wherein the processing unit performs one of (1) an operation of inhibiting the playback of the content and (2) an operation of displaying the message over an image of the content being played back.

13. The playback apparatus of claim 12, wherein the processing unit receives, from a user, an instruction of whether to inhibit the playback of the content or to display the message over the image of the content being played back, and performs the one of (1) the operation of inhibiting the playback of the content and (2) the operation of displaying the message over the image of the content, based on the received instruction.

14. The playback apparatus of claim 12,
wherein the execution program records therein control information indicating one of (1) inhibiting the playback of the content and (2) displaying the message over the image of the content, and
wherein the processing unit reads the control information from the execution program and performs the one of (1) the operation of inhibiting the playback of the content and (2) the operation of displaying the message over the image of the content, based on the read control information.

15. A message acquisition method used on a playback apparatus that plays content from a recording medium provided by a content provider,
wherein the recording medium has the content and a program recorded thereon,
wherein the message acquisition method comprises:
a reading step of reading the program from the recording medium at a time of a playback of the content;
a startup step of starting up and executing the read program;
an interaction step of interacting with the program; and
a processing step of receiving, from the program, a message that is determined according to a result of the interaction performed by the interaction step, and of performing a process corresponding to the received message,
wherein the program is an execution program that is executed at the time of the playback of the content,
wherein the processing step displays the received message,
wherein the execution program includes two or more messages that are provided by the content provider and that are to be displayed by the playback apparatus,
wherein the apparatus unique information is assigned to each of a plurality of playback apparatuses, the plurality of playback apparatuses including the playback apparatus,
wherein the apparatus unique information assigned to each of the plurality of apparatuses is associated with a different message of the two or more messages,
wherein the interaction step notifies, to the execution program, apparatus unique information assigned and unique to the playback apparatus, and
wherein the message that the processing step receives as the result of the interaction is one message of the two or more messages and is selected by the execution program according to the apparatus unique information.

16. A non-transitory computer-readable recording medium having a message acquisition program, a content and a program recorded thereon, the message acquisition program being used on a playback apparatus that plays the content from the non-transitory computer-readable recording medium provided by a content provider, the message acquisition program causing the playback apparatus to execute a method comprising:
a reading step of reading the program from the recording medium at a time of a playback of the content;
a startup step of starting up and executing the read program;
an interaction step of interacting with the program; and
a processing step of receiving, from the program, a message that is determined according to a result of the interaction performed by the interaction step and of performing a process in accordance with the received message,
wherein the program is an execution program that is executed at the time of the playback of the content,
wherein the processing step displays the received message,
wherein the execution program includes two or more messages that are provided by the content provider and that are to be displayed by the playback apparatus,
wherein the apparatus unique information is assigned to each of a plurality of playback apparatuses, the plurality of playback apparatuses including the playback apparatus,
wherein the apparatus unique information assigned to each of the plurality of apparatuses is associated with a different message of the two or more messages,
wherein the interaction step notifies, to the execution program, apparatus unique information assigned and unique to the playback apparatus, and
wherein the message that the processing step receives as the result of the interaction is one message of the two or more messages and is selected by the execution program according to the apparatus unique information.

17. An integrated circuit of a playback apparatus for playing back content from a recording medium that is provided by a content provider,
wherein the recording medium has the content and a program recorded thereon,
wherein the integrated circuit comprises:
a reading unit operable to read the program from the recording medium at a time of a playback of the content;
a startup unit operable to start up and execute the read program;
an interaction unit operable to interact with the program; and
a processing unit operable to receive, from the program, a message that is determined according to a result of the interaction performed by the interaction unit, and operable to perform a process in accordance with the received message,
wherein the program is an execution program that is executed at the time of the playback of the content,
wherein the processing unit displays the received message,
wherein the execution program includes two or more messages that are provided by the content provider and that are to be displayed by the playback apparatus,
wherein the apparatus unique information is assigned to each of a plurality of playback apparatuses, the plurality of playback apparatuses including the playback apparatus,
wherein the apparatus unique information assigned to each of the plurality of apparatuses is associated with a different message of the two or more messages,
wherein the interaction unit notifies, to the execution program, apparatus unique information assigned and unique to the playback apparatus, and
wherein the message that the processing unit receives as the result of the interaction is one message of the two or more messages and is selected by the execution program according to the apparatus unique information.

18. The playback apparatus of claim 9, wherein the reading unit reads the content from the recording medium at the time of the playback of the content.

19. The playback apparatus of claim 9, wherein the execution program includes a bytecode.

20. A playback apparatus for playing back content from a recording medium that is provided by a content provider,
wherein the recording medium has the content and a program associated with the content recorded thereon, and
wherein the playback apparatus comprises:
a playback unit configured to playback the content recorded on the recording medium;

an execution unit configured to (i) read the program recorded on the recording medium before the playback of the content, (ii) execute the read program, which is utilized for determining whether the content is permitted to be played back by the playback apparatus and includes one or more messages utilized for notifying a user of the playback apparatus of one or more reasons that the content is not permitted to be played back, and (iii) determine whether the content is permitted to be played back using the program recorded on the recording medium; and a display control unit configured to (i) receive, based on an interaction with the execution unit, one message that is included in the recorded program, and corresponds to one reason that the content is not permitted to be played back, and is determined according to apparatus unique information unique to the playback apparatus, and (ii) display the received message, and wherein the apparatus unique information is a model number of the playback apparatus.

\* \* \* \* \*